United States Patent
Ishikawa

(10) Patent No.: US 7,899,259 B2
(45) Date of Patent: Mar. 1, 2011

(54) IMAGE PROCESSING METHOD AND IMAGE PROCESSING APPARATUS FOR IMAGES DECODABLE AT MULTIPLE RESOLUTIONS

(75) Inventor: Tomoe Ishikawa, Minato-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 917 days.

(21) Appl. No.: 11/753,040

(22) Filed: May 24, 2007

(65) Prior Publication Data

US 2007/0274599 A1 Nov. 29, 2007

(30) Foreign Application Priority Data

May 29, 2006 (JP) ............... 2006-149022

(51) Int. Cl.
*G06K 9/36* (2006.01)
*G06K 9/46* (2006.01)
(52) U.S. Cl. ............... 382/232; 382/233; 382/240
(58) Field of Classification Search ............... None
See application file for complete search history.

(56) References Cited

U.S. PATENT DOCUMENTS

| | | | | |
|---|---|---|---|---|
| 6,763,139 | B1* | 7/2004 | Andrew | 382/240 |
| 2003/0142871 | A1* | 7/2003 | Ishikawa | 382/233 |
| 2004/0081334 | A1* | 4/2004 | Hayashi | 382/100 |
| 2004/0109610 | A1* | 6/2004 | Kodama et al. | 382/240 |
| 2004/0141653 | A1* | 7/2004 | Kishi | 382/232 |
| 2004/0165780 | A1* | 8/2004 | Maki et al. | 382/232 |
| 2004/0170332 | A1* | 9/2004 | Andrew | 382/233 |
| 2005/0074174 | A1* | 4/2005 | Ishikawa | 382/232 |

FOREIGN PATENT DOCUMENTS

JP 06-078157 A 3/1994

OTHER PUBLICATIONS

Michael J. Gormish and Serene Banerjee, "Tile-based transport of JPEG 2000 images," VLVB03, Madrid, Spain, Sep. 2003.*
JPEG 2000 Part I Final Committee Draft Version 1.0, Annex B, Data ordering, Mar. 2000.*

* cited by examiner

*Primary Examiner*—Samir A Ahmed
*Assistant Examiner*—Li Liu
(74) *Attorney, Agent, or Firm*—Canon USA, Inc. IP Division

(57) ABSTRACT

An image processing method to control an image processing device. Encoded data of tiles of acquired image data is encoded to be decodable at multiple resolutions. The method determines whether encoded data of each tile consists of data of at least three tile-parts, each being at a resolution level. Decoding the data of some tile-parts results in an image resolution that is different from that obtained by decoding other tile-parts data. Tile-parts are designated to be decoded to obtain a designated resolution image. If it is determined that an acquired tile encoded data consists of the data of the at least three tile-parts, data of designated tile-parts is decoded. An image obtained by the decoding is resized and output. Depending on whether encoded data of each acquired tile in the encoded image data consists of the data of the at least three tile-parts, the acquired encoded image data is reconstructed.

4 Claims, 21 Drawing Sheets

FIG. 3A
FIG. 3B
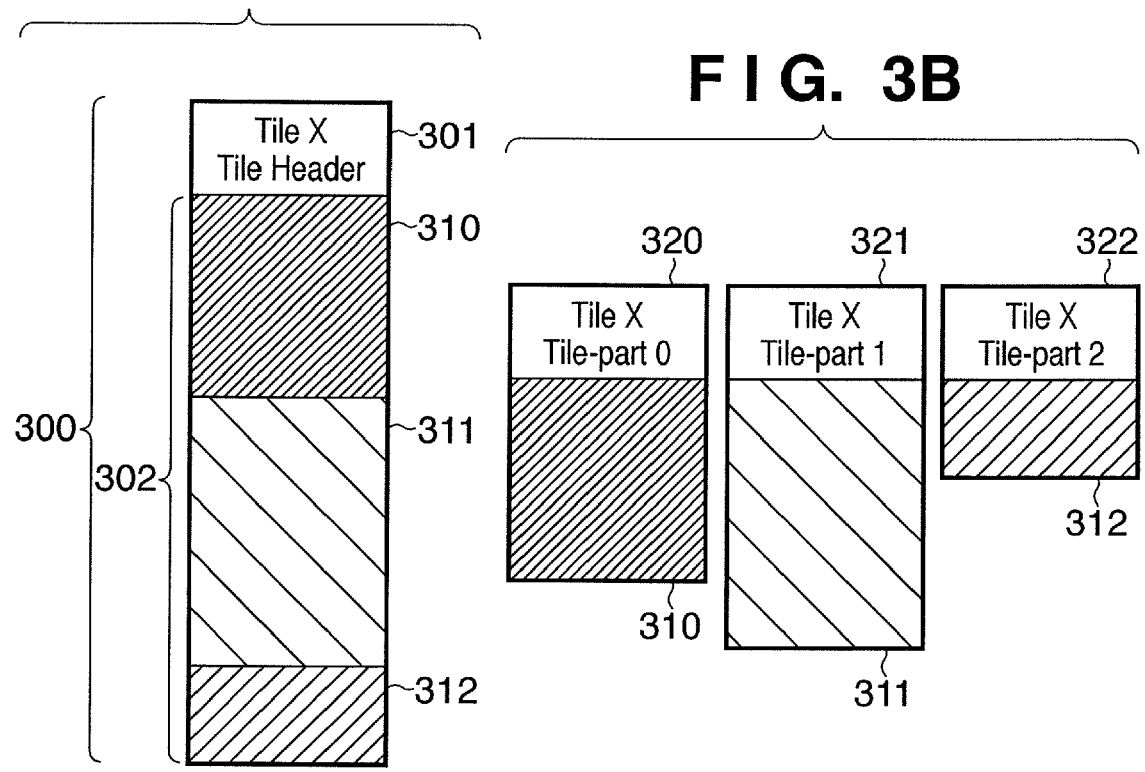
FIG. 3C
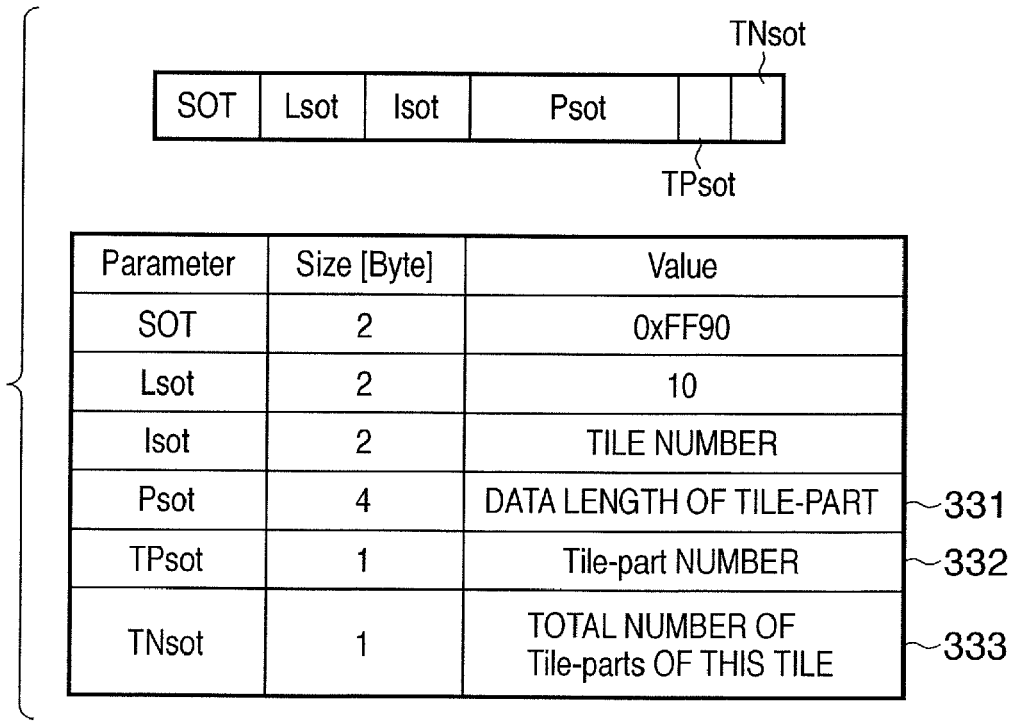

FIG. 4A

| Main header |
|---|
| Tile 0 Tile-part 0 |
| Tile 1 Tile-part 0 |
| Tile 2 Tile-part 0 |
| Tile 0 Tile-part 1 |
| Tile 1 Tile-part 1 |
| Tile 2 Tile-part 1 |
| Tile 0 Tile-part 2 |
| Tile 1 Tile-part 2 |
| Tile 2 Tile-part 2 |

FIG. 4B

| Main header |
|---|
| Tile 0 Tile-part 0 |
| Tile 1 Tile-part 0 |
| Tile 2 Tile-part 0 |
| Tile 1 Tile-part 1 |
| Tile 2 Tile-part 1 |
| Tile 2 Tile-part 2 |
| Tile 0 Tile-part 1 |
| Tile 1 Tile-part 2 |
| Tile 0 Tile-part 2 |

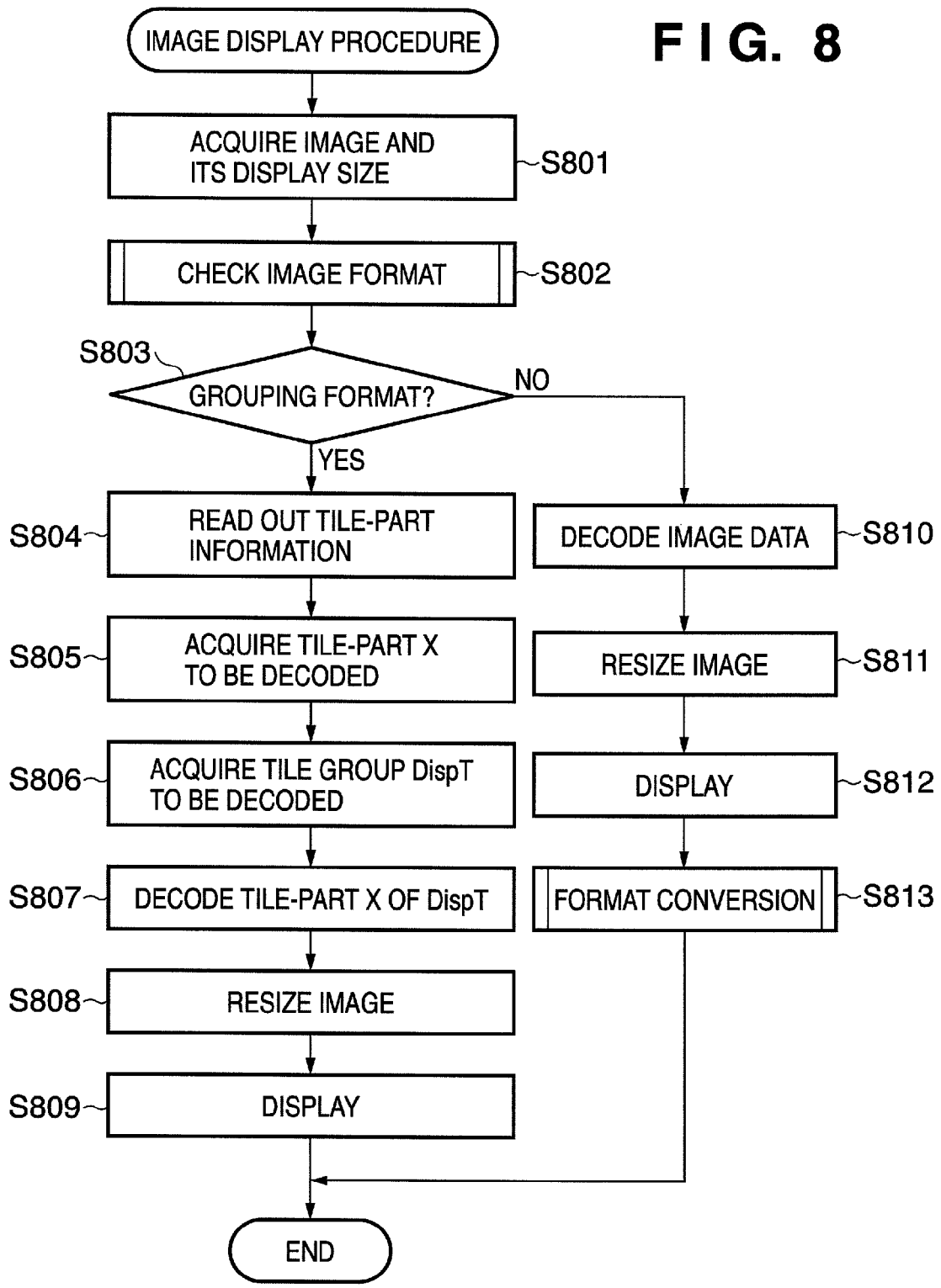
F I G. 8

FIG. 11A

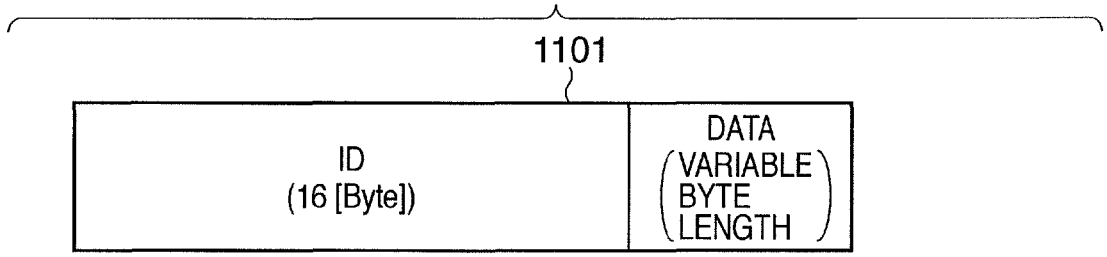

1101

| FIELD NAME | DATA LENGTH [Byte] | CONTENTS |
|---|---|---|
| ID | 16 | ID USED TO SPECIFY VENDOR SPECIFIC INFORMATION STORED IN DATA FIELD ; ID IS DEFINED AS 0x6369 7A65 6772 6F75 7065 666F 726D 6174 IN THIS EMBODIMENT |
| DATA | ARBITRARY | Vendor specific INFORMATION ; FORMAT IS ARBITRARY |

FIG. 11B

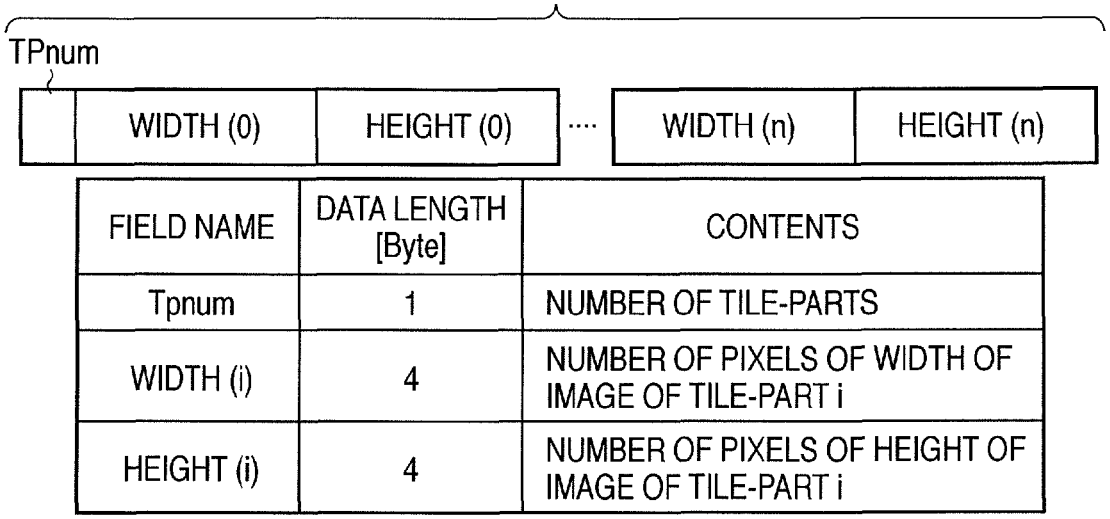

| FIELD NAME | DATA LENGTH [Byte] | CONTENTS |
|---|---|---|
| Tpnum | 1 | NUMBER OF TILE-PARTS |
| WIDTH (i) | 4 | NUMBER OF PIXELS OF WIDTH OF IMAGE OF TILE-PART i |
| HEIGHT (i) | 4 | NUMBER OF PIXELS OF HEIGHT OF IMAGE OF TILE-PART i |

FIG. 11C

| LBox | TBox | ID |
|---|---|---|
| 0x0000 0039 | 0x7575 6964 | 0x6369 7A65 6772 6F75 7065 666F 726D 6174 |

| 0x03 | 0x0000 0138 | 0x0000 00D0 | 0x0000 09BA | 0x0000 0680 | 0x0000 1380 | 0x0000 0D00 |
|---|---|---|---|---|---|---|
| TPnum | WIDTH | HEIGHT | WIDTH | HEIGHT | WIDTH | HEIGHT |
| | IMAGE SIZE OF Tile-part 0 | | IMAGE SIZE OF Tile-part 1 | | IMAGE SIZE OF Tile-part 2 | |

FIG. 16

```xml
<?xml version="1.0" encoding="shift_JIS"?>
<sizeGroupFormat
xmlns : sgformat="http://www.format.cano.co.jp/">
    <sgformat : numTilePart> 3 </sgformat : numTilePart>
    <sgformat : sizeTilePartImage id=0>
        <sgformat : width> 312 </sgformat : width>
        <sgformat : height> 208 </sgformat : height>
    </sgformat : sizeTilePartImage>
    <sgformat : sizeTilePartImage id=1>
        <sgformat : width> 2496 </sgformat : width>
        <sgformat : height> 1664 </sgformat : height>
    </sgformat : sizeTilePartImage>
    <sgformat : sizeTilePartImage id=2>
        <sgformat : width> 4992 </sgformat : width>
        <sgformat : height> 3328 </sgformat : height>
    </sgformat : sizeTilePartImage>
</sgformat : sizeGroupFormat>
```

FIG. 17

```
<?xml version="1.0" encoding="shift_JIS"?>
<sizeGroupFormat xmlns : sgformat="http://www.format.cano.co.jp/">
    <sgformat : numTilePart> 3 </sgformat : numTilePart>
    <sgformat : sizeTilePartImage id=0>
        <sgformat : width> 312 </sgformat : width>
        <sgformat : height> 208 </sgformat : height>
        <sgformat : dataLen> 300 </sgformat : dataLen>
    </sgformat : sizeTilePartImage>
    <sgformat : sizeTilePartImage id=1>
        <sgformat : width> 2496 </sgformat : width>
        <sgformat : height> 1664 </sgformat : height>
        <sgformat : dataLen> 600 </sgformat : dataLen>
    </sgformat : sizeTilePartImage>
    <sgformat : sizeTilePartImage id=2>
        <sgformat : width> 4992 </sgformat : width>
        <sgformat : height> 3328 </sgformat : height>
        <sgformat : dataLen> 1000 </sgformat : dataLen>
    </sgformat : sizeTilePartImage>
</sgformat : sizeGroupFormat>
```

| Rinside | WIDTH | HEIGHT | RDLen⁰ | ..... | RDLenⁿ |

2101

| PARAMETER | SIZE [byte] | CONTENTS | |
|---|---|---|---|
| Rinside | 2 | NUMBER OF resolutions INCLUDED IN TILE-PART | 2102 |
| WIDTH | 4 | NUMBER OF PIXELS OF WIDTH OF TILE-PART IMAGE | 2103 |
| HEIGHT | 4 | NUMBER OF PIXELS OF HEIGHT OF TILE-PART IMAGE | 2104 |
| RDLenⁱ | 4 | DATA LENGTH OF i-TH resolution INCLUDED IN TILE-PART | 2105 |

FIG. 21

IMAGE PROCESSING METHOD AND IMAGE PROCESSING APPARATUS FOR IMAGES DECODABLE AT MULTIPLE RESOLUTIONS

BACKGROUND OF THE INVENTION

1. Field of the Invention

The present invention relates to a technique which handles an image encoded to be decodable at a plurality of resolutions.

2. Description of the Related Art

Digital cameras that have prevailed in recent years have enormous numbers of pixels, and those which have about two to five million pixels are popular. Furthermore, professional digital cameras of 10 million pixel classes have begun to prevail, and appearance of higher-definition digital cameras in the future is easily conceivable.

An application which handles an image having such a large size often generates a plurality of resolution data and stores them in one file. There are mainly two saving methods of the plurality of resolution data.

In one method, a plurality of resolution data which are completely independent from an original image are generated, and are subsequently saved in one file. In the other method, an original image is encoded using an encoding method having resolution scalability to save the encoded data. Exif/DCF created by a digital still camera is an example of the former, and the JPEG2000 file format is that of the latter.

Japanese Patent Laid-Open No. 06-078157 discloses a method of saving a plurality of original images using the encoding method having resolution scalability.

With this method, encoded data in an image file is divisionally saved in a memory area.

Each group includes one or a plurality of rank data, and the saving start position in the memory area and data read direction are designated for each group. In this way, new image data can be easily added without forming any blank space.

As an example, a case will be examined below wherein data of rank 0 to 2 form group 1, those of rank 3 to 5 form group 2, and that of rank 6 forms group 3.

In this case, after data of group 1 of image 0 is written from the head position toward the backward positions in the memory area, data of group 1 of image 1, data of group 1 of image 2, . . . , are written in turn.

Data of group 2 are written from the middle position in the memory area toward the head position of the memory area like data of group 2 of image 0, that of group 2 of image 1, that of group 2 of image 2, . . . .

Furthermore, data are written from the rearmost position of the memory area toward the head position of the memory like data of group 3 of image 0, that of group 3 of image 1, that of group 3 of image 2, . . . .

As an example of the former method that saves a plurality of independent data Exif/DCF created by digital still cameras is known. Exif/DCF creates a thumbnail image from an original image as independent image data, and saves the thumbnail image and original image in one file. Upon saving images of required resolutions in one file, since only images of the resolutions which have one-to-one correspondence with thumbnail display that an application always uses, and full-screen display are saved, the application can easily use such images.

However, since all images are independent encoded data, they include much redundant data. When the number of types of image sizes to be saved in one file increases, the image file size becomes large.

As the latter method that saves using the encoding method having resolution scalability, for example, JPEG2000 is known. Since the JPEG2000 encoding method uses difference data between respective resolutions, even if a plurality of resolutions of images is provided, its file size does not increase. However, in JPEG2000, a certain resolution image has a size obtained by halving the horizontal and vertical sizes of a resolution image one level higher than the certain resolution image, and more resolutions are provided in addition to those which are used frequently.

The above reference discloses a device to save a plurality of images within a predetermined capacity. This saves difference data between respective resolutions in turn from encoded data of a low-resolution image, as in the JPEG2000 file format, as long as the free capacity of the memory remains.

Therefore, more resolutions are provided in addition to those which are frequently used.

Since the head positions of the area to be saved and data write directions are different for respective groups, a long memory seek time is required depending on grouping methods.

That is, in the aforementioned example, in order to read data of rank 3 of image 1, the head position where the data of group 0 of image 1 is detected from the head position of the memory area, and data of group 0 are read from that position in the backward direction of the memory area. Then, the head position where data of group 1 of image 1 is detected, and data of rank 3 is read from that position in the forward direction of the memory area.

Since JPEG2000 encoded data has a high degree of freedom, even when a file of encoded data is saved as a cluster, data required for display do not always form a cluster and may be scattered all over the file. For this reason, the application must search for data to be decoded so as to obtain an image of a required resolution, resulting in an increase in number of seek times in the file. Hence, it is difficult to shorten the display time.

When the application that handles high-definition images saves only required resolution images, independent image data are generated for respective resolutions, and image data which originally have large data sizes form a file of a still larger size. With the method of preparing images of resolutions required by the application using encoded data which use difference data and have scalability, the file size remains unchanged, but even images of unnecessary resolutions are prepared. Furthermore, with this method, every time the application uses images, it must analyze encoded data and select a required resolution image from a plurality of resolution images.

SUMMARY OF THE INVENTION

The present invention has been made in consideration of the aforementioned problems, and provides a technique for generating an image file having a file format in which each individual application saves only required resolution images without increasing the file size.

According to an aspect of the present invention an image processing method includes: acquiring encoded image data which includes encoded data of a plurality of tiles obtained by segmenting an image into the tiles, and encoding the tiles to be decodable at a plurality of resolutions; designating parts of the encoded data of the respective tiles to be decoded to obtain an image with a designated image quality; decoding the designated parts of the encoded data of the respective tiles to obtain an image with the designated image quality; reconstructing the encoded image data so as to hold the parts to be decoded designated of the encoded data of the respective tiles as a data group in which the parts to be decoded are arranged in an arrangement order of tiles; and outputting respective decoded tiles.

According to another aspect of the present invention, an image processing apparatus includes: an acquisition unit adapted to acquire encoded image data which includes encoded data of a plurality of tiles obtained by segmenting an image into the tiles, and encoding the tiles to be decodable at a plurality of resolutions; a designation unit adapted to designate parts to be decoded of the encoded data of the respective tiles to obtain an image with a designated image quality; a decoding unit adapted to decode designated parts of the encoded data of the respective tiles to obtain the image with the designated image quality; a reconstruction unit adapted to reconstruct the encoded image data so as to hold the parts to be decoded designated by the designation unit of the encoded data of the respective tiles as a data group in which the parts to be decoded are arranged in an arrangement order of tiles; and an output unit adapted to output respective tiles decoded by the decoding unit.

Further features of the present invention will become apparent from the following description of exemplary embodiments with reference to the attached drawings.

BRIEF DESCRIPTION OF THE DRAWINGS

FIG. 3A is a view showing tile data;

FIG. 3B is a view showing configuration examples of respective tile-part data when tile data 300 shown in FIG. 3A is broken up into three tile-part data;

FIG. 3C is a view showing a configuration example of a tile-part header;

FIG. 4A is a view showing an allocation example of respective tile-part data in a bitstream;

FIG. 4B is a view showing a configuration example of a bitstream when tile-part data are randomly allocated in the bitstream;

FIG. 8 is a flowchart of the processing to be executed by the image processing apparatus so as to display an image on a display screen of an output device;

FIG. 11A is a view showing the Box Contents format of a uuid box;

FIG. 11B is a view showing the configuration of tile-part information;

FIG. 11C is a view showing tile-part information according to the first embodiment of the present invention;

FIG. 16 is a view showing an example of tile-part information described in XML;

FIG. 17 is a view showing an example of tile-part information using XML;

FIG. 21 is a view showing the internal structure of the COM marker.

DESCRIPTION OF THE EMBODIMENTS

The present invention will be described in detail hereinafter by way of exemplary embodiments with reference to the accompanying drawings.

First Embodiment

Figure 1:
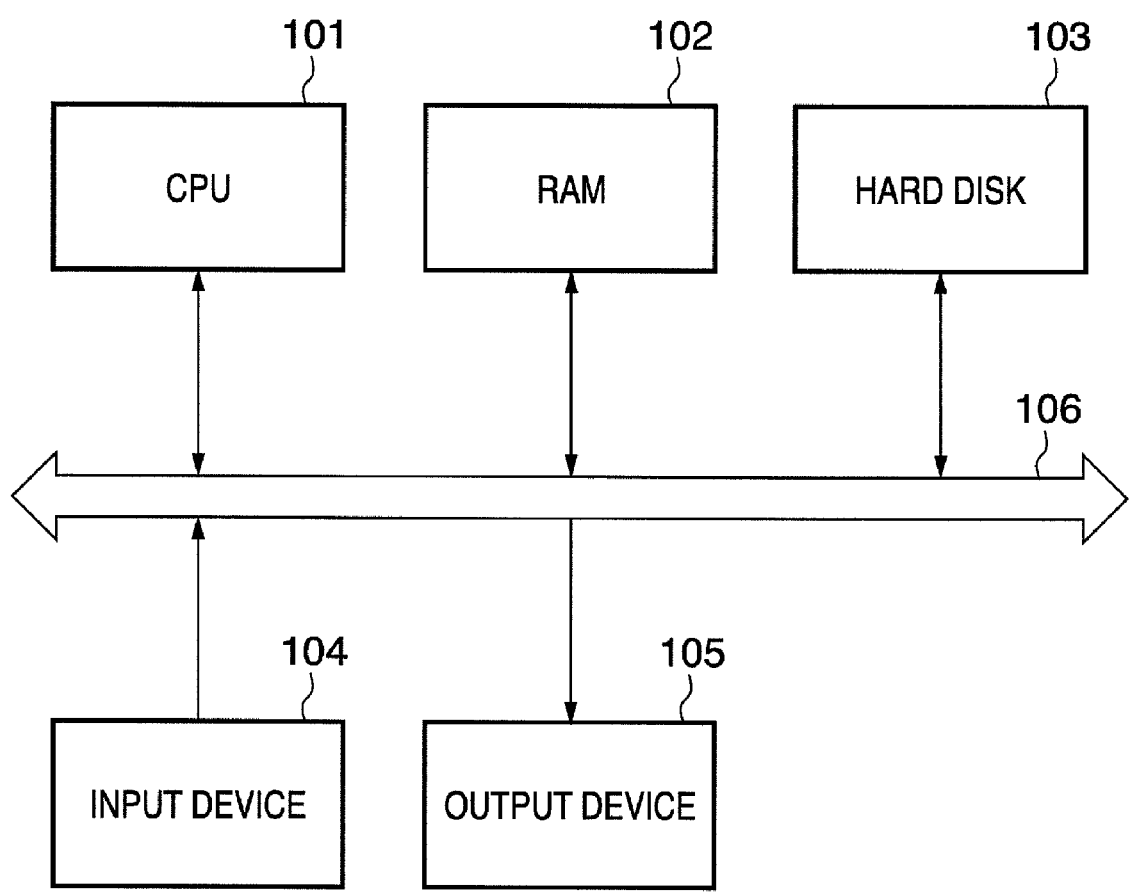
FIG. 1 is a block diagram showing the hardware arrangement of a computer which is applicable to an image processing apparatus according to the first embodiment of the present invention.

FIG. 1 is a block diagram showing a hardware arrangement of a computer which is applicable to an image processing apparatus according to an exemplary embodiment. Note that a known PC (personal computer) and WS (workstation) are applicable as such a computer.

A CPU 101 controls the overall computer using programs and data loaded into a RAM 102, and executes respective processes to be described later which are to be implemented by the image processing apparatus to which this computer is applied.

The RAM 102 has an area for temporarily storing programs and data loaded from a hard disk 103, a work area used when the CPU 101 executes various kinds of processing, and the like. That is, the RAM 102 can provide various areas as needed.

The hard disk 103 stores an OS (operating system), and programs and data for making the CPU 101 execute respective processes to be described later. These programs and data are loaded into the RAM 102 as needed under the control of the CPU 101 and become objects to be processed by the CPU 101.

An input device 104 is an instruction input device represented by, e.g., a mouse, keyboard, and the like. When the operator of this computer operates this input device 104, he or she can input various instructions to the CPU 101.

An output device 105 is a device represented by, e.g., a display, printer, and the like, and can output images processed by this computer in various forms such as display, printout, and the like.

A bus 106 interconnects the aforementioned units. Note that the hardware arrangement of the computer applicable to the image processing apparatus according to this embodiment is not limited to that shown in FIG. 1.

Figure 2:
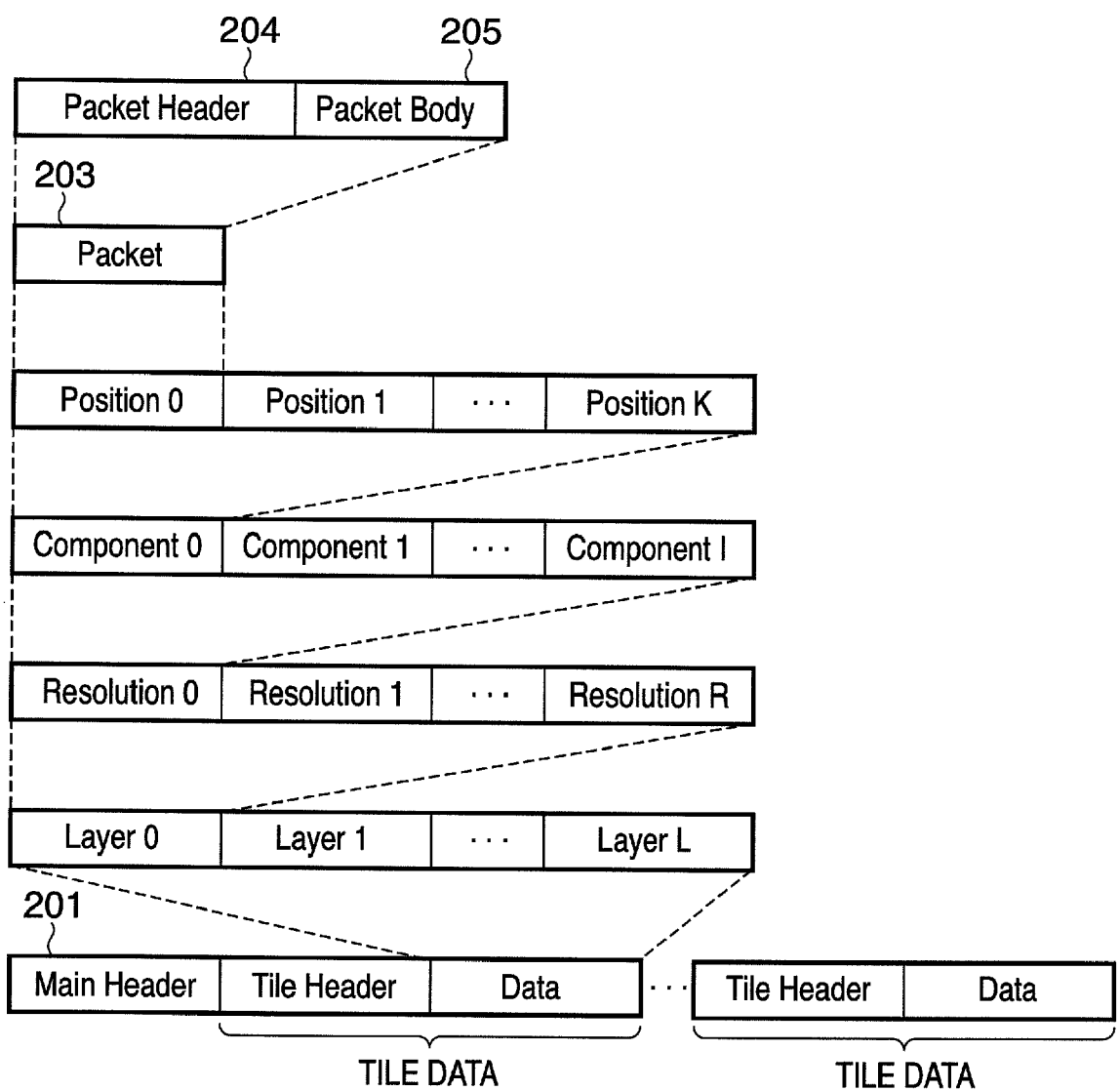
FIG. 2 is a view showing the configuration of a JPEG2000 bitstream according to Layer-resolution level-component-position progression.

Next, a general bitstream according to JPEG2000 will be described below. FIG. 2 shows the configuration of a JPEG2000 bitstream according to Layer-resolution level-component-position progression (to be abbreviated as LRCP hereinafter). According to the LRCP, encoded data (a part indicated by "Data" in FIG. 2) includes a configuration in which data are allocated in the order of Layer/Resolution/Component/Position. Such configuration is called a progression order. "Position" in FIG. 2 means "precinct" in JPEG2000 encoded data.

As shown in FIG. 2, the bitstream according to JPEG2000 includes a main header (Main Header) 201 and a plurality of tile data. Furthermore, each tile data includes a tile header (Tile Header) and encoded data (Data).

The main header 201 describes the encoding conditions of the entire image such as the number of resolution levels, the number of layers, and the like.

Tile data is generated by segmenting an original image to be encoded into rectangles (tiles) with a predetermined size, and encoding each individual segmented tile, and one tile data is generated per tile. Therefore, the bitstream includes as many tile data as the number of segmented tiles. Each tile data includes a header part (tile header) and an encoded data main body part (encoded data), as described above.

As shown in FIG. 2, the encoded data can be roughly classified into data for respective Layers. Data of each Layer is encoded data of each bitplane based on known bitplane encoding, and data are allocated in turn from a bitplane on the MSB side (Layer 0) up to a bitplane on the LSB side (Layer L). A Layer number corresponds to an S/N ratio of an image to be decoded to the original image. The S/N ratio becomes worse (lower) with decreasing Layer number. That is, as the JPEG2000 data shown in FIG. 2, respective Layer data are allocated in turn from the lowest S/N.

Furthermore, the data of each Layer includes data of respective resolutions. The data of respective resolutions are allocated in an order along Resolution numbers according to resolutions (image sizes). The Resolution number of an image with the lowest resolution is 0, and the width and height of an image are doubled every time the Resolution number is incremented by "1." In each Layer, data are stored in ascending order of Resolution number.

The data of each Resolution includes data of respective Components. The data of respective Components correspond to respective color data of an image. For example, when an image includes RGB data, data of Component 0 is R component data, data of Component 1 is G component data, and data of Component 2 is B component data. That is, the number of Components matches the number of dimensions of a color space of an image.

In each Component data, data of spatial positions (Position data) in the original image to be encoded are recorded in turn. The respective Position data are given numbers (position numbers) according to the spatial order in each tile. That is, the upper left corner of a tile of a certain Resolution is defined as 0, and the number is incremented one by one to the right of the tile. If the right end is reached, the number is incremented from the left end of one line below to the right of the tile.

In one JPEG2000 file, the maximum values of the Resolution number, Layer number, Component number, and Position number are set in advance by an encoder. The original image to be encoded is encoded according to the parameters, and the main header records that information. Each packet 203 includes a packet header 204 that manages information of code-blocks stored in that packet, and a packet body 205 that includes encoded data of respective code-blocks. In FIG. 2, one Position data corresponds to a packet 203. This "packet" is a kind of logical unit.

In FIG. 2, for the sake of descriptive convenience, one tile data includes a tile header as one cluster and encoded data as one cluster. However, in practice, one tile data is segmented into a plurality of tile-part data.

FIG. 3A shows tile data. Tile data 300 shown in FIG. 3A has the same configuration as that shown in FIG. 2, and includes a tile header 301 and encoded data 302. The tile header 301 is header data obtained by encoding tile X, and the encoded data 302 is that of tile X obtained by this encoding. FIG. 3B shows a case wherein the tile data of tile X is segmented into three tile-parts.

FIG. 3B shows configuration examples of respective tile-part data when the tile data 300 shown in FIG. 3A is segmented into three tile-part data. The three tile-part data shown in FIG. 3B respectively hold parts 310, 311, and 312 which form the encoded data 302 shown in FIG. 3A as encoded data parts. The encoded data part 310 is appended with a tile-part header 320 (tile-part number=0). The encoded data part 311 is appended with a tile-part header 321 (tile-part number=1). The encoded data part 312 is appended with a tile-part header 322 (tile-part number=2).

In this way, the tile data is segmented into a plurality of tile-part data to have the aforementioned packets as units. That is, the tile data cannot be segmented in the middle of a packet. In the following description, tile data with a tile number=N will often be referred to as tile data N, and tile-part data with a tile-part number=N will often be referred to as tile-part data N.

FIG. 3C shows a configuration example of the tile-part header. As shown in FIG. 3C, the tile-part header describes a tile number, the data length of a tile-part 331, a tile-part number 332, and the total number of tile-parts in this tile (how many tile-parts the tile is segmented into) 333.

FIG. 4A shows an allocation example of tile-part data in a bitstream. In FIG. 4A, tile-part data 0 in respective tile data are allocated in the order of tile numbers. That is, tile-part data 0 of tile data 0, that of tile data 1, and that of tile data 2 are allocated in this order. If the number of tiles is three or more, tile-part data 0 of subsequent tile data are allocated after these tile-part data.

Next, tile-part data 1 of the respective tile data are allocated in the order of tile numbers. That is, tile-part data 1 of tile data 0, that of tile data 1, and that of tile data 2 are allocated in this order. If the number of tiles is three or more, tile-part data 1 of subsequent tile data are allocated after these tile-part data.

In this way, in FIG. 4A, tile-part data having the same tile-part number are extracted from the respective tile data, and the extracted tile-part data are arranged in ascending order of tile number of the tile data to which the extracted data themselves belong and are allocated in the bitstream. Tile-part data groups having the same tile-part numbers are allocated in ascending order of tile-part number.

FIG. 4B shows a configuration example of a bitstream when tile-part data are randomly allocated in the bitstream.

Figure 5:
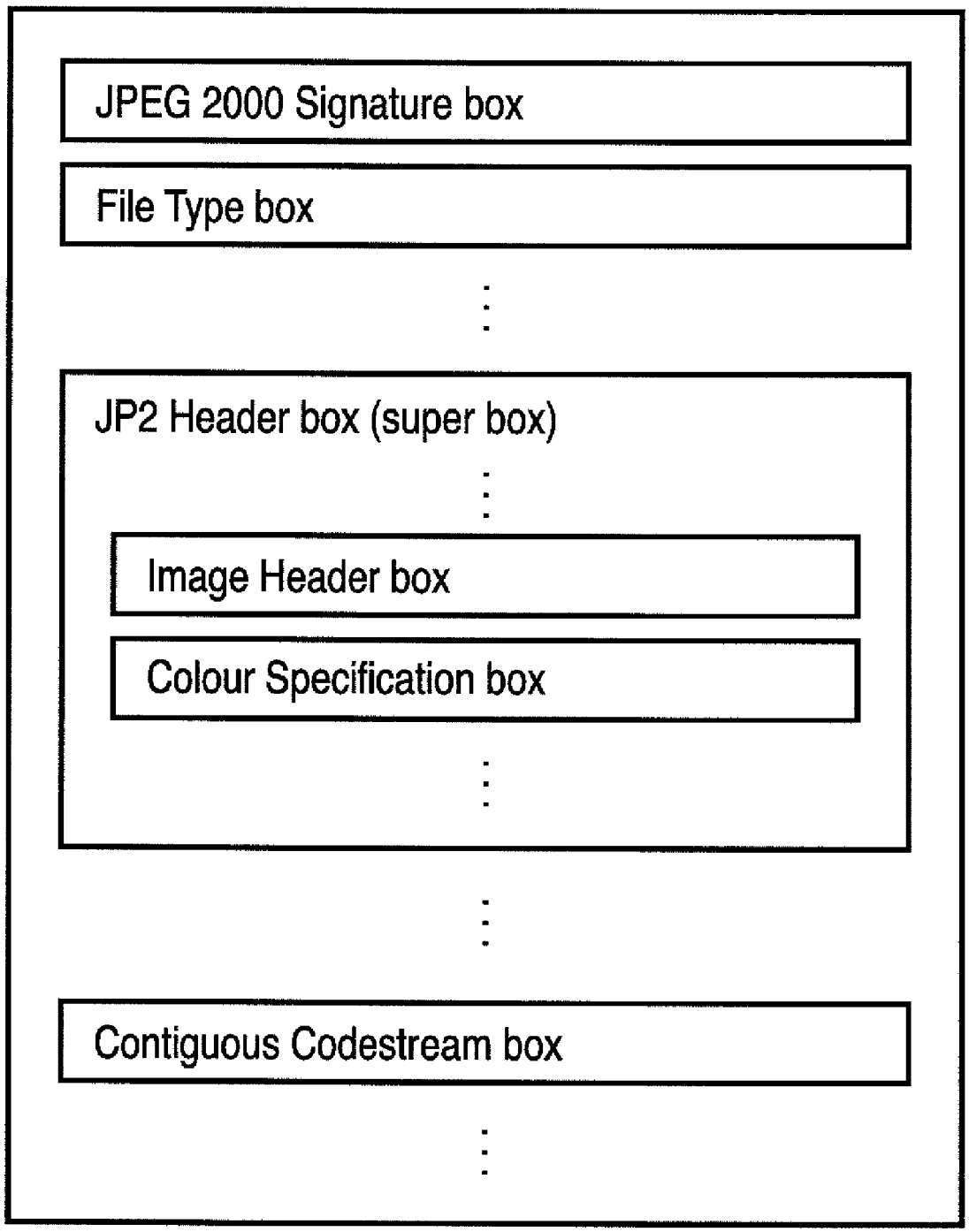
FIG. 5 is a view showing an overview of the JPEG2000 file format.

The JPEG2000 file format will be described below. FIG. 5 shows an overview of the JPEG2000 file format.

ISO/IEC defines a format of a file that stores a JPEG2000 bitstream as an option. A file format defined by JPEG2000 Part 1 is called a JP2 file format. The JP2 file format has a structure called "box structure." This format is configured by piling up data units called "box."

In the JP2 file format, JPEG2000 encoded data is stored in one box called "Contiguous Codestream box." A box that stores a plurality of boxes as the contents of that box exists. Such a box is called a "super box." A JP2 Header box defined by the JP2 file format is one of such "super boxes." This JP2 Header box stores an Image Header box that stores basic information of an image, a Colour Specification box that designates a color space, and the like as the contents.

Boxes shown in FIG. 5 are mandatory boxes defined by the JP2 file format. In addition, an XML box and uuid box are specified. The storage order of boxes determined in the JP2 file format is to store a JPEG2000 Signature box at the head of a file, and to store a File Type box immediately after that box. The storage order of other boxes is basically freely determined. Therefore, if there are two files having the same types of boxes, these files may have different storage orders of these boxes.

Figure 6:
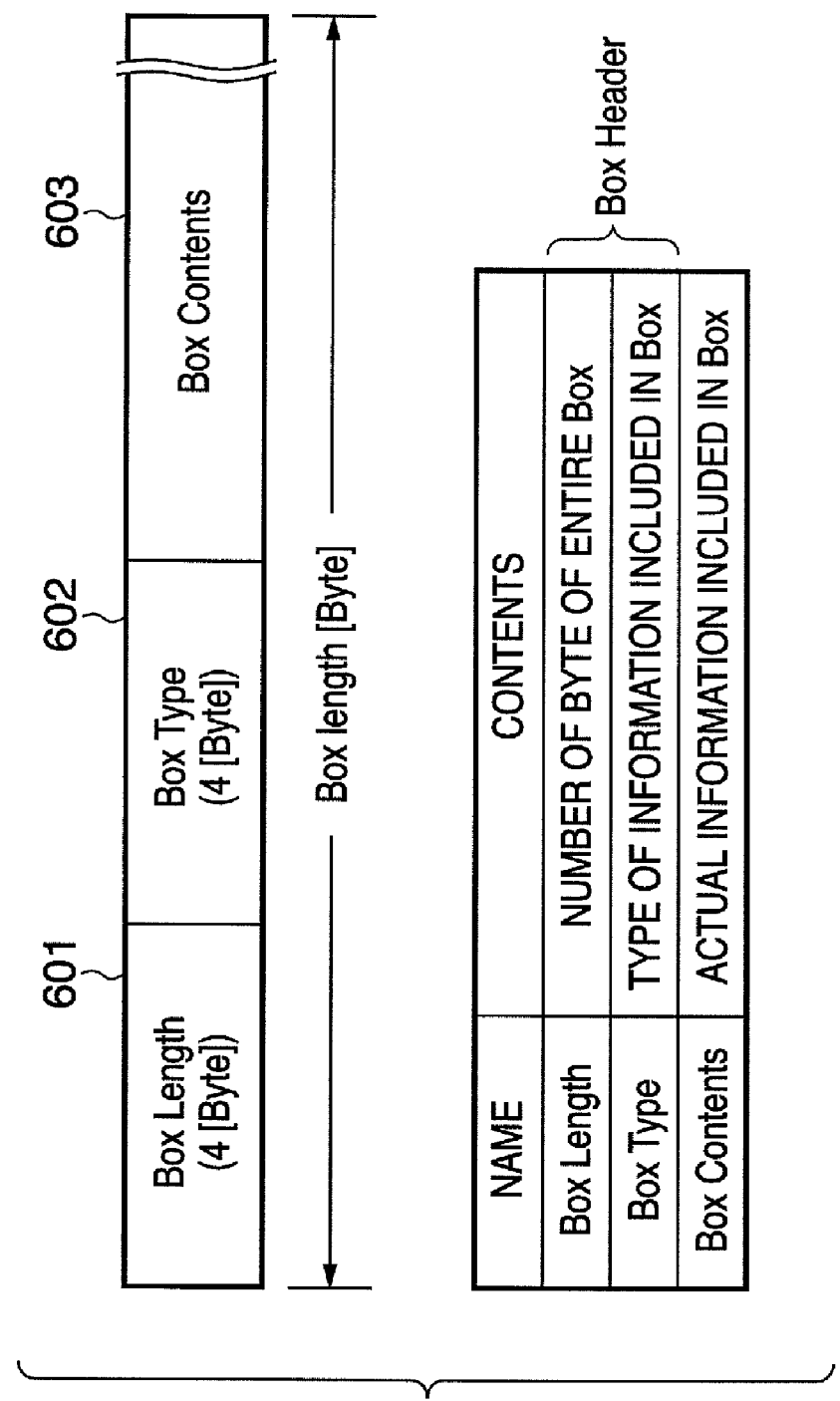
FIG. 6 is a view showing the basic configuration of a box.

FIG. 6 shows the basic configuration of a box. A "Box Length" field 601 stores the number of bytes of the data length of the overall box, a "Box Type" field 602 stores the type of this box, and a "Box Contents" field 603 stores data defined for this box.

The "Box Length" field 601 and "Box Type" field 602 are called a Box header in combination. For example, in case of a "JPEG2000 Signature box," the Box Type field value is 'jp' (0x6A60 2020), and the Box Contents field stores 4-byte data (0x0D0A 870A). Hence, the "Box Length" field 601 stores 12 (0x0000 000C), the "Box Type" field 602 stores 'jp' (0x6A60 2020), and the "Box Contents" field 603 stores 0x0D0A 870A.

The processing to be executed by the image processing apparatus according to this embodiment so as to display an image at a resolution designated by the operator will be described below. In this description, assume that the operator designates one of a display mode (resolution) from three different types of image display modes shown in FIGS. 7A to 7C.

Figure 7A:
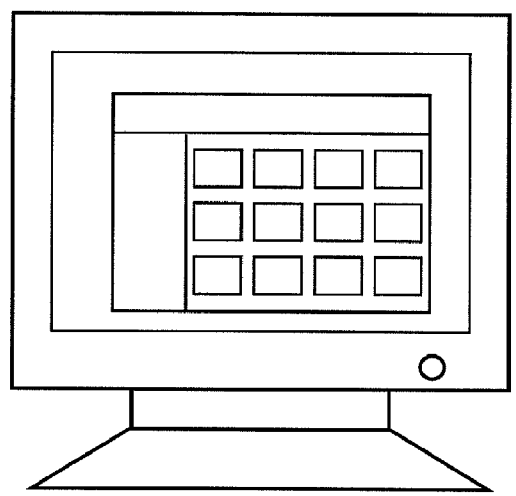
FIG. 7A shows a display example when thumbnails of respective images (bitstreams in practice) held in a hard disk are displayed as a list.

FIG. 7A shows a display example when thumbnails of images (bitstreams in practice) held in the hard disk 103 are displayed as a list. The thumbnail size is a size of 256 pixels×256 pixels or equivalent. Note that "or equivalent" means that a thumbnail does not always have a size of 256 pixels×256 pixels depending on the aspect ratio of an original image held in the hard disk 103. For example, the size of a thumbnail of an image having 4992 pixels×3328 pixels is 256 pixels×170 pixels.

Figure 7B:
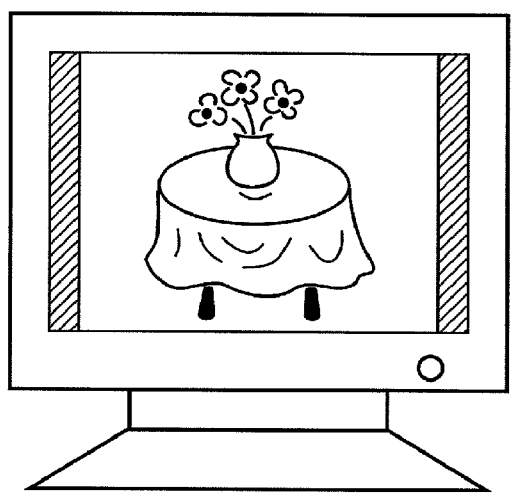
FIG. 7B shows a display example when a designated image is displayed on a full screen.
Figure 7C:
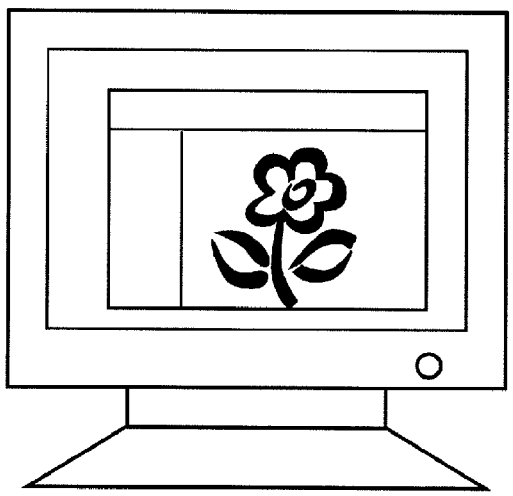
FIG. 7C shows a display example when a designated image is displayed at an equal scale.

When the operator designates one thumbnail on the screen shown in FIG. 7A using the input device 104, the designated image is displayed to fit the display screen size of the output device (display device in this case) 105 (full-screen display), as shown in FIG. 7B. Alternatively, as shown in FIG. 7C, the designated image is displayed to have a size at an equal scale on the display screen of the output device 105. The operator designates one of these display modes.

FIG. 7B shows a display example when the designated image is full-screen displayed. In this embodiment, assume that the size of the display screen of the output device 105 is 1920 pixels×1200 pixels for the sake of descriptive convenience. Therefore, upon full-screen displaying of an image, that image must be resized to 1920 pixels×1200 pixels before displaying.

FIG. 7C shows a display example when the designated image is displayed at an equal scale. In this embodiment, assume that the original size of the designated image is 4992 pixels×3328 pixels for the sake of descriptive convenience.

FIG. 8 is a flowchart showing the processing to be executed by the image processing apparatus upon displaying an image on the display screen of the output device 105. Note that programs and data for making the image processing apparatus execute the processes shown in the flowcharts to be described hereinafter as well as the flowchart shown in FIG. 8 are stored in the hard disk 103. These programs and data are loaded onto the RAM 102 under the control of the CPU 101 as needed. When the CPU 101 executes the processes using the loaded programs and data, the image processing apparatus implements the processes to be described hereinafter.

When the operator of the image processing apparatus inputs a designation associated with image display (including an image to be displayed and a designation of its display size (display mode), the CPU 101 acquires the image to be displayed and its display size from this designation in step S801.

For example, when the operator designates the display mode shown in FIG. 7A, the image to be displayed includes all images held in the hard disk 103, and the display size of each individual image is 256 pixels×256 pixels or equivalent. When the operator designates the display mode shown in FIG. 7B, since he or she also designates the image to be displayed, the designated image is to be displayed, and the display size is 1920 pixels×1200 pixels. When the operator designates the display mode shown in FIG. 7C, he or she selects an image designated upon designation of this display mode or an image which is full-screen displayed in advance as the image to be displayed, and its display size is 4992 pixels×3328 pixels.

In the following description, assume that the operator designates thumbnail display (the display mode shown in FIG. 7A) as an example. In this case, in step S801 all the images held in the hard disk 103 are selected as images to be displayed, and the display size is set as 256 pixels×256 pixels or equivalent.

In step S802, the CPU 101 checks the format (image format) of the bitstream of each image selected as that to be displayed in step S801. Details of this checking processing will be described later using FIG. 9.

As a result of the checking processing in step S802, if the image format is a grouping format (to be described later), the process advances to step S804 via step S803. If the image format is not a grouping format, the process advances to step S810 via step S803.

In step S804, the CPU 101 reads out tile-part information from a uuid box in the bitstream. In this embodiment, if the image format is a grouping format, tile-part information is stored in this uuid box by the processing in step S813 to be described later. Therefore, in step S804 the CPU 101 can read out the tile-part information stored in this uuid box. The tile-part information has a configuration shown in FIG. 11B. FIG. 11B shows a configuration of tile-part information. Assume that this embodiment uses tile-part information shown in FIG. 11C as that having such configuration. By reading out this tile-part information, assume that the CPU 101 can obtain following pieces of information about tile-parts in the bitstream:

the number of tile-parts is 3;
the size of an image obtained by decoding tile-part data 0 is 312 pixels×208 pixels;
the size of an image obtained by decoding tile-part data 1 is 2496 pixels×1664 pixels; and
the size of an image obtained by decoding tile-part data 2 is 4992 pixels×3328 pixels.

Referring back to FIG. 8, in step S805 the CPU 101 determines one of these three tile-part data to be decoded based on the display size set in step S801. In this case, since the display size is set as 256 pixels×256 pixels in step S801, the CPU 101 determines tile-part data 0 as data to be decoded (X=0) so as to decode an image of 312 pixels×208 pixels as the size closest to the determined display size.

In step S806, the CPU 101 determines tile DispT to be decoded of all the tiles in the bitstream. In this case, since all tiles which form thumbnails, i.e., images are to be displayed, all the tiles in the bitstream are inevitably selected as those to be decoded. If the size of the display screen of the output device 105 is 1500 pixels×1000 pixels, one tile size is 512 pixels×512 pixels, and an image to be displayed is to be displayed at an equal scale, a total of six tiles (three tiles in the vertical direction×two tiles in the horizontal direction) are to be displayed. In this case, these six tiles are DispT.

In step S807, the CPU 101 executes processing for decoding only tile-part data determined in step S805 for each of the tiles determined as those to be decoded in step S806. In this case, since tile-part data 0 of all the tiles are determined to be decoded, these determined tile-part data are decoded. With this processing, images of 312 pixels×208 pixels are obtained.

In step S808, the CPU 101 resizes so that the size of the decoded image has 256 pixels×256 pixels or equivalent. In step S809, the CPU 101 displays the resized image on the display screen of the output device 105.

On the other hand, in step S810 the CPU 101 decodes the bitstream of an image to be displayed to reclaim the image to be displayed. Upon this decoding, the CPU 101 copies the bitstream temporarily, and decodes the copied bitstream. That is, data of the bitstream is left intact since it is to be processed in step S813 to be described later.

As described above, the original size of the reclaimed image is 4992 pixels×3328 pixels. Therefore, in step S811 in order to display a thumbnail of this reclaimed image, the CPU 101 resizes the size of this image to 256 pixels×256 pixels or equivalent. In practice, this image is resized to 256 pixels× 170 pixels.

In step S812, the CPU 101 displays this resized image on the display screen of the output device 105 as a thumbnail. In step S813, the CPU 101 reconstructs the bitstream of the image decoded in step S810 and converts its format to the grouping format. Details of the processing in step S813 will be described later using FIG. 10.

Figure 9:
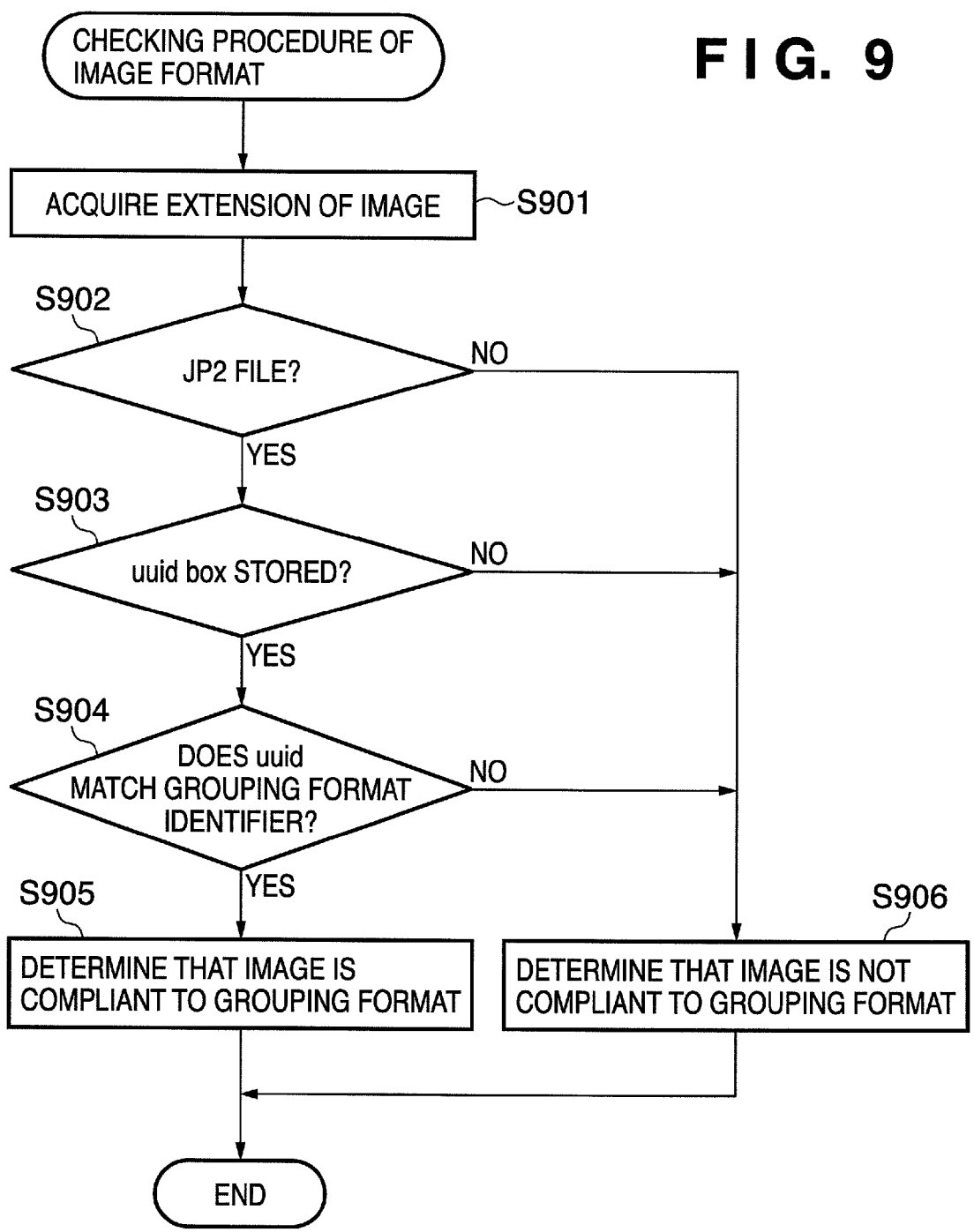
FIG. 9 is a flowchart showing details of checking processing.

FIG. 9 is a flowchart showing details of the checking processing in step S802.

In step S901, the CPU 101 acquires a file extension of each image to be displayed. The CPU 101 checks in step S902 if the acquired extension is ".jp2." As a result of checking, if the extension is ".jp2," the process advances to step S903; otherwise, the process advances to step S906. In step S906, the CPU 101 determines that the format of the bitstream of this image is not a grouping format, and the process returns to step S803 above.

On the other hand, the CPU 101 checks in step S903 if the bitstream (jp2 file) stores a uuid box. If the bitstream stores a uuid box, the process advances to step S904; otherwise, the process advances to step S906.

The CPU 101 checks in step S904 if the ID of the uuid box matches a grouping format identifier.

FIG. 11A shows the format of the "Box Contents" field 603 of the uuid box. In step S904, the CPU 101 refers to the value of a 16-Byte ID 1101 to check if this value indicates the grouping format. In this embodiment, the ID value of the grouping format is "0x6369 7A65 6772 6F75 7065 666F 726D 6174," as shown in FIG. 11C. Hence, if the value of the ID 1101 matches "0x6369 7A65 6772 6F75 7065 666F 726D 6174," since the ID of the uuid box matches the grouping format identifier, the process advances to step S905. If they do not match, the process advances to step S906.

In step S905, the CPU 101 determines that the format of the bitstream of the image to be displayed is the grouping format, and the process returns to step S803.

Figure 10:
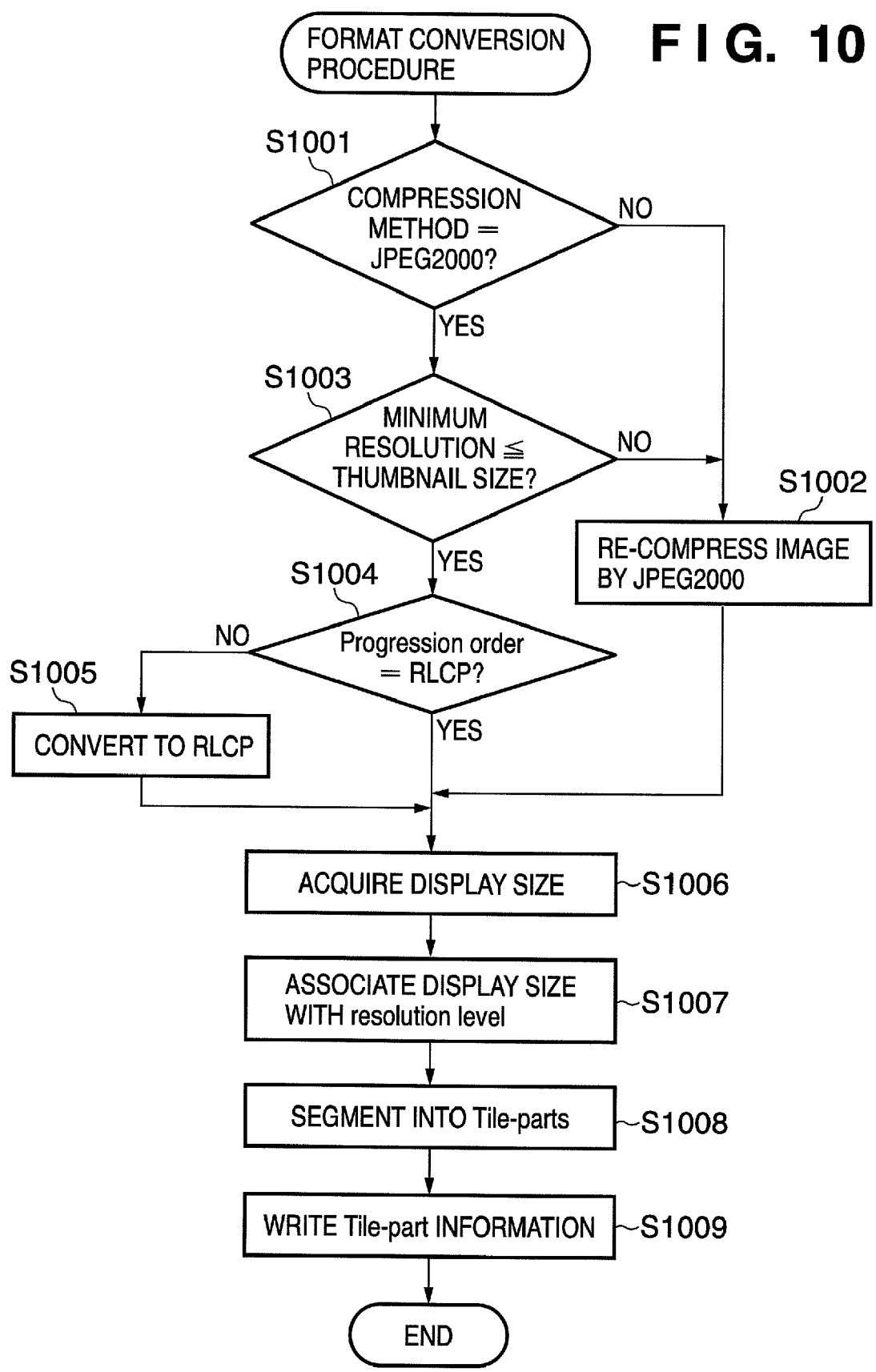
FIG. 10 is a block diagram showing details of format conversion processing.

FIG. 10 is a flowchart showing details of the format conversion processing in step S813.

The CPU 101 checks in step S1001 if the decoding processing executed in step S810 is compliant with JPEG2000. That is, the CPU 101 checks if the bitstream of the image to be displayed is compliant with JPEG2000.

As a result of checking, if the decoding processing executed in step S810 is not compliant with JPEG2000, the process advances to step S1002. In step S1002, the CPU 101 compresses the image decoded in step S810 according to JPEG2000 to generate a new bitstream of the image to be displayed. With this compression processing, the CPU 101 generates the following bitstream:

Tile size at a highest resolution: 512 pixels×512 pixels
Number of Layers: 1
Number of Positions: 1 position per tile
Resolution Level: discrete wavelet transformation processing is repeated until the image size at a lowest resolution becomes a thumbnail size or equivalent
Progression Order: RLCP In this embodiment, since the horizontal size of an original image is 4992 pixels, when tiles each having a horizontal size of 512 pixels are arranged horizontally, 10 tiles are required. Also, since the vertical size of the original image is 3328 pixels, when tiles each having a vertical size of 512 pixels are arranged vertically, seven tiles are required. Therefore, 10×7=70, and the number of tiles is 70. Also, the number of resolution levels is 5.

Even when the bitstream of the image to be displayed is compliant to JPEG2000, this embodiment sets a tile size at the highest resolution to be 512 pixels×512 pixels and a minimum image size upon decoding the bitstream to be 312 pixels×208 pixels. Therefore, the number of tiles is 70, and the number of resolution levels is 5. Processing then advances to step S1006.

On the other hand, as a result of checking in step S1001, if the decoding processing done in step S810 is compliant to JPEG2000, the process advances to step S1003.

The CPU 101 checks in step S1003 with reference to the main header in the original bitstream decoded in step S810 if an image of a minimum size (lowest resolution) obtained by decoding this bitstream is smaller than or equal to the thumbnail size. That is, the CPU 101 checks if an image of a required minimum size is obtained by decoding this bitstream.

If the image size less than twice the required minimum size (thumbnail size) is obtained by decoding the bitstream, the CPU 101 determines that the minimum size (lowest resolution) obtained by decoding this bitstream is smaller than the thumbnail size. In this embodiment, the thumbnail size is 256 pixels×256 pixels or equivalent. Therefore, if the image size of resolution level 0 is a size equal to or smaller than 511 pixels×511 pixels, the CPU 101 determines that the minimum size (lowest resolution) of the image obtained by decoding this bitstream is smaller than the thumbnail size. The image size of Resolution level 0 can be easily calculated by analyzing the main header of JPEG2000.

If the minimum size (lowest resolution) of the image obtained by decoding this bitstream is not smaller than the thumbnail size, the process advances to step S1002 to execute the aforementioned processing. On the other hand, when the size of the lowest resolution is smaller than or equal to the thumbnail size, the process advances to step S1004.

The CPU 101 checks in step S1004 with reference to the main header of the bitstream and headers of respective tiles if the progression order of the bitstream is RLCP. As a result of checking, if the progression order is RLCP, the process advances to step S1006; otherwise, the process advances to step S1005. In step S1005, the CPU 101 rearranges packet data in the bitstream to convert the progression order to RLCP, and rewrites the progression order information in the main header to RLCP. Processing then advances to step S1006.

In step S1006, the CPU 101 acquires display sizes in all the display modes. In this embodiment, all the display modes are the three different types of display modes shown in FIGS. 7A to 7C, and the respective image display sizes are 256 pixels× 256 pixels or equivalent, 1920 pixels×1200 pixels, and 4992 pixels×3328 pixels. Therefore, in this embodiment, the CPU 101 acquires these three different display sizes. For example, upon acquiring the image display size in the full-screen display mode by executing a program implemented in C, the CPU 101 uses, e.g., the following code:

SystemParametersInfo(SPI_GETWORKAREA, 0, &rect, 0);

In step S1007, the CPU 101 associates the display sizes acquired in step S1006 with resolution levels. In this embodiment, the original size of the image to be displayed is 4992 pixels×3328 pixels, and the minimum image size upon decoding the bitstream is 312 pixels×208 pixels. Therefore, this image has undergone 4 levels of discrete wavelet transformation processing. Therefore, the relationship between the resolution levels and image sizes is as follows:

resolution level 0: 312 pixels×208 pixels
resolution level 1: 624 pixels×416 pixels
resolution level 2: 1248 pixels×832 pixels
resolution level 3: 2496 pixels×1664 pixels
resolution level 4: 4992 pixels×3328 pixels In this way, upon displaying a thumbnail of this image, resolution level 0 need only be decoded. Upon full-screen displaying of this image, resolution levels 1, 2, and 3 need only be decoded in addition to resolution level 0. Upon displaying this image at an equal scale, resolution level 4 need only be decoded in addition to resolution levels 0, 1, 2, and 3. Therefore, the thumbnail display mode corresponds to resolution level 0, the full-screen display mode corresponds to resolution level 3, and the equal-scale display mode corresponds to resolution level 4. In step S1007, the CPU 101 determines this association.

In step S1008, the CPU 101 segments respective tile data into a plurality of tile-part data, and allocates the respective tile-part data, as shown in FIG. 4A. That is, the CPU 101 classifies all the tile-part data to groups for those which have the same tile-part numbers, and allocates the respective groups in ascending order of tile-part number. Tile-part data in each group are allocated in ascending order of tile number of tile data to which the tile-part data themselves belong.

In this embodiment, data of resolution level 0 is stored in tile-part data 0, data of resolution levels 1, 2, and 3 are stored in tile-part data 1, and data of resolution level 4 is stored in tile-part data 2. In this manner, the bitstream of the image is reconstructed.

Figure 12:
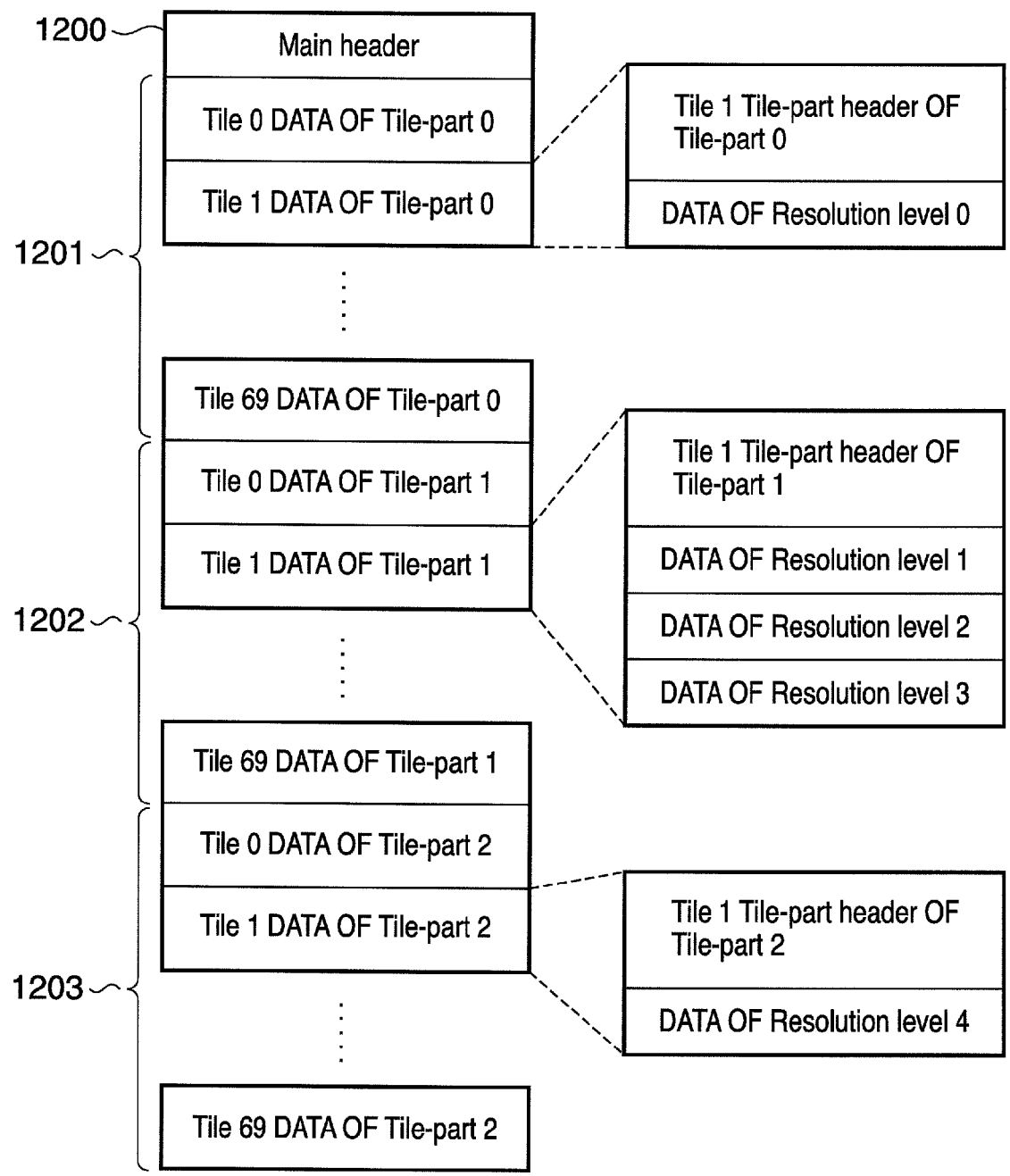
FIG. 12 is a view showing the configuration of a bitstream which is reconstructed as a result of segmenting processing.

FIG. 12 shows the configuration of the reconstructed bitstream as a result of the processing in step S1008.

As shown in FIG. 12, a data group 1201 of tile-part data 0, a data group 1202 of tile-part data 1, and a data group 1203 of tile-part data 2 in respective tile data are allocated in the bitstream in this order.

In the data group 1201, tile-part data 0 in tile data 0, tile-part data 0 in tile data 1, . . . , tile-part data 0 in tile data 69 are allocated in this order. Also, as shown in FIG. 12, tile-part data 0 in tile data 1 stores a tile-part header and data of resolution level 0 in tile data 1. In this way, tile-part data 0 in tile data X stores the tile-part header and data of resolution level 0 in tile data X.

In the data group 1202, tile-part data 1 in tile data 0, tile-part data 1 in tile data 1, tile-part data 1 in tile data 69 are allocated in this order. Also, as shown in FIG. 12, tile-part data 1 in tile data 1 stores a tile-part header, and data of resolution levels 1, 2, and 3 in tile data 1. In this way, tile-part data 1 in tile data X stores the tile-part header, and data of resolution levels 1, 2, and 3 in tile data X.

In the data group 1203, tile-part data 2 in tile data 0, tile-part data 2 in tile data 1, . . . , tile-part data 2 in tile data 69 are allocated in this order. Also, as shown in FIG. 12, tile-part data 2 in tile data 1 stores a tile-part header and data of resolution level 4 in tile data 1. In this way, tile-part data 2 in tile data X stores the tile-part header and data of resolution level 4 in tile data X.

Note that each tile-part header can be easily created using three data: a tile-part data length Psot, tile-part number Tpsot, and the total number Tnsot of tile-parts.

In this manner, the bitstream can be reconstructed to that compliant to the grouping format.

Referring back to FIG. 10, in step S1009 the CPU 101 writes tile-part information, i.e., the number of tile-parts and the image sizes of respective tile-parts in the uuid box. In this embodiment, the CPU 101 writes a uuid box shown in FIG. 11C in a JP2 file.

In this manner, since resolution data are grouped using tile-parts for the display sizes respectively required by all the display modes, the number of seek times is reduced and the time required until display can be shortened upon displaying the entire images at low and middle resolutions.

By storing the tile-part information in the file, the number of tile-parts required to obtain a necessary image size can be easily detected without analyzing the main header and checking the number of packets of respective tile-parts.

Furthermore, by segmenting tiles, when an image is displayed only partially at a high resolution, the required part need only be decoded for respective tiles, and the random accessibility of a high-resolution part can be assured, thus expecting to shorten the time required until display.

Since information is stored in the uuid box, the file configuration can be seen by checking its identifier that tiles are segmented into tile-parts for respective resolutions, and the tile-parts are arranged in ascending order in the file. As can be seen for the same reason as above, the respective tile-parts are arranged in ascending order of tile number. Since the application side need only decode data of a target resolution in turn from the head of encoded data, the number of seek times in the file is reduced, and the time required until display can be shortened.

Furthermore, since the bitstream reconstructed by the aforementioned processing is compliant to the JPEG2000 JP2 file format, even when a terminal or application which does not know this format receives this data, it can decode an image without any influence.

Note that practical numerical values used in the above description such as the display image sizes, image sizes of respective resolution levels, and the like are merely examples, and this embodiment is not limited to these numerical values.

The processing in the above description can be applied to only one display mode in place of a plurality of display modes.

Upon designating which of the three display modes is used to display an image, the operator may operate an application which may select the display mode in response to that operation, or the operator may directly designate the display mode. That is, the designation method is not particularly limited, and any other designation methods may be adopted.

Second Embodiment

In the first embodiment, if it is determined in step S802 in the flowchart in FIG. 8 that the bitstream has the grouping format, parts to be decoded for the required display mode are decoded, and the decoded result is displayed.

Upon using image data by one terminal or application, since the format is optimized to that terminal or application, the processing according to the first embodiment suffices. However, upon using the file compliant to this format by another terminal or application, the file may be easily used if its format is modified.

In this embodiment, the bitstream which is reconstructed by the processing according to the first embodiment is input to a notebook type PC whose display screen size is 1024 pixels×768 pixels, and an image based on this bitstream is displayed on that display screen. The processing to be executed by the image processing apparatus side in advance will be explained below under assumption of such a situation. Information associated with the bitstream which is reconstructed by the processing according to the first embodiment is as follows:

Image size: 4992×3328 [pixels]
Tile size: 512×512 [pixels]
The number of resolution levels: 5
Image size of resolution level 0: 312×208 [pixels]
Image size of resolution level 1: 624×416 [pixels]
Image size of resolution level 2: 1248×832 [pixels]
Image size of resolution level 3: 2496×1664 [pixels]
Image size of resolution level 4: 4992×3328 [pixels]
Tile-part data 0 stores data of resolution level 0
Tile-part data 1 stores data of resolution levels 1, 2, and 3
Tile-part data 2 stores data of resolution level 4

In this embodiment as well, all the display modes are those shown in FIGS. 7A to 7C (however, the full-screen display mode is executed in correspondence with the screen size (1024 pixels×768 pixels) of the notebook type PC). In the following description, the same image processing apparatus as in the first embodiment is used. In this embodiment, a description of the same processes as the first embodiment will not be repeated and different processes will be described in detail. The same applies to embodiments to be described hereinafter.

Figure 13:
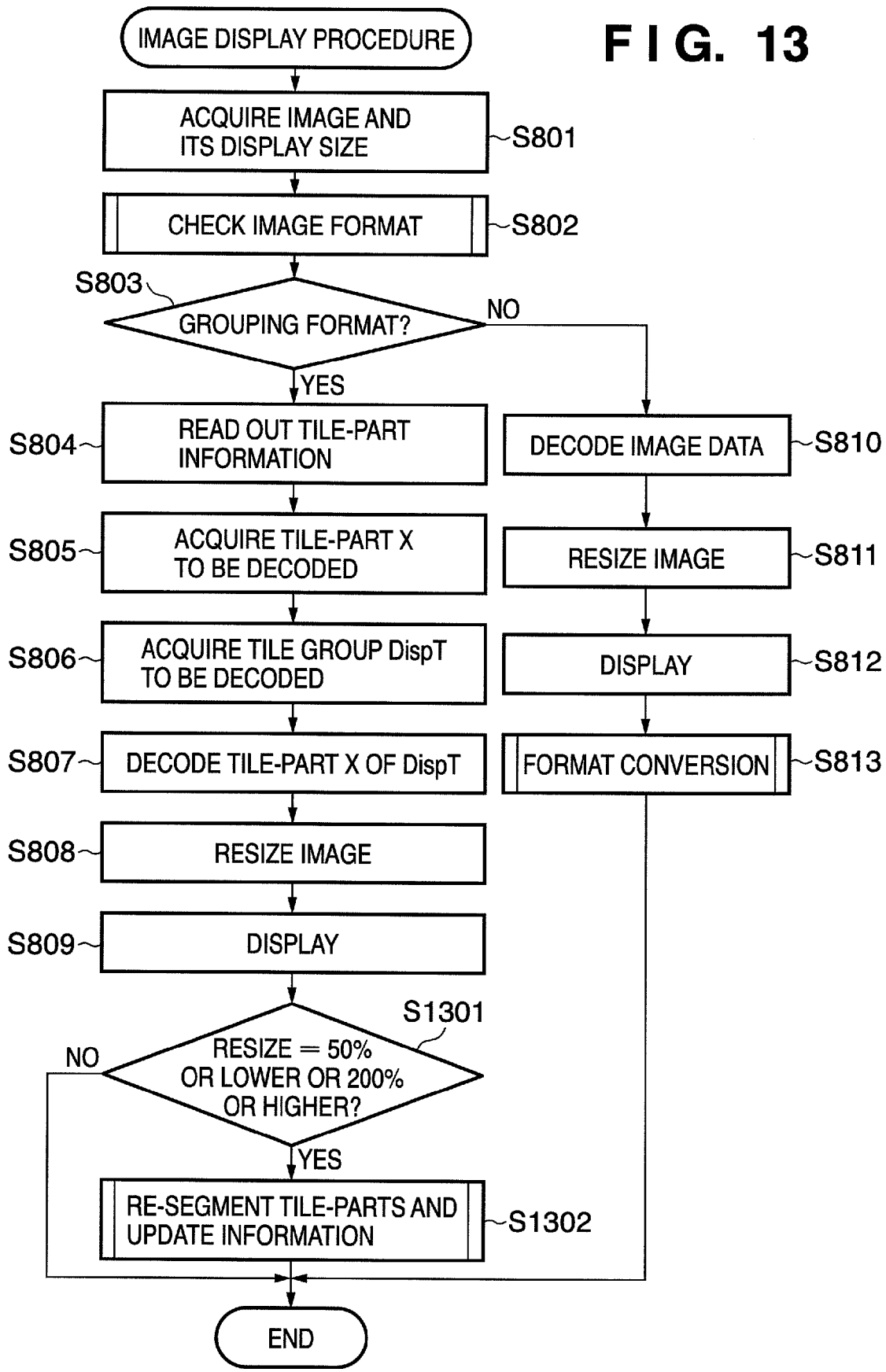
FIG. 13 is a flowchart of the processing to be executed by the image processing apparatus so as to display an image on the display screen of the output device.

FIG. 13 is a flowchart of the processing to be executed by the image processing apparatus so as to display an image on the display screen of the output device 105. The same step numbers in the flowchart of FIG. 13 denote the same processes as in steps shown in FIG. 8, and a description thereof will not be repeated. That is, only a difference in the flowchart of FIG. 13 from that shown in FIG. 8 is that processes in steps S1301 and S1302 are executed after step S809. Therefore, these steps S1301 and S1302 will be described below.

The CPU 101 checks in step S1301 if the enlargement/reduction scale of resizing done in step S808 is 50% or less, or 200% or more. As a result of checking, if the enlargement/reduction scale falls within the range from 50% to 200%, this processing ends. On the other hand, if the enlargement/reduction scale is 50% or less, or 200% or more, the process advances to step S1302.

In JPEG2000, if the resolution level number is decremented by one, the image size is halved. Therefore, enlarging an image of a certain resolution level to twice or more or reducing the image to ½ or less is nothing but use of an image of another resolution level. Therefore, although tile-part data to be decoded is selected in step S805 above, enlarging this data to twice or more or reducing it to ½ or less means that the configuration itself of the tile-part to be decoded is wrong. In this embodiment, upon decoding and displaying tile-part data 2 in step S808, the display image size is 2496 pixels×1664 pixels. However, since the screen size of the notebook type PC is 1024 pixels×768 pixels, an image must be reduced to about 40%.

Therefore, in such a case, the process advances to step S1302. In step S1302, the CPU 101 executes the tile-part segmentation processing again, and updates the corresponding contents in the tile-part information.

Figure 14:
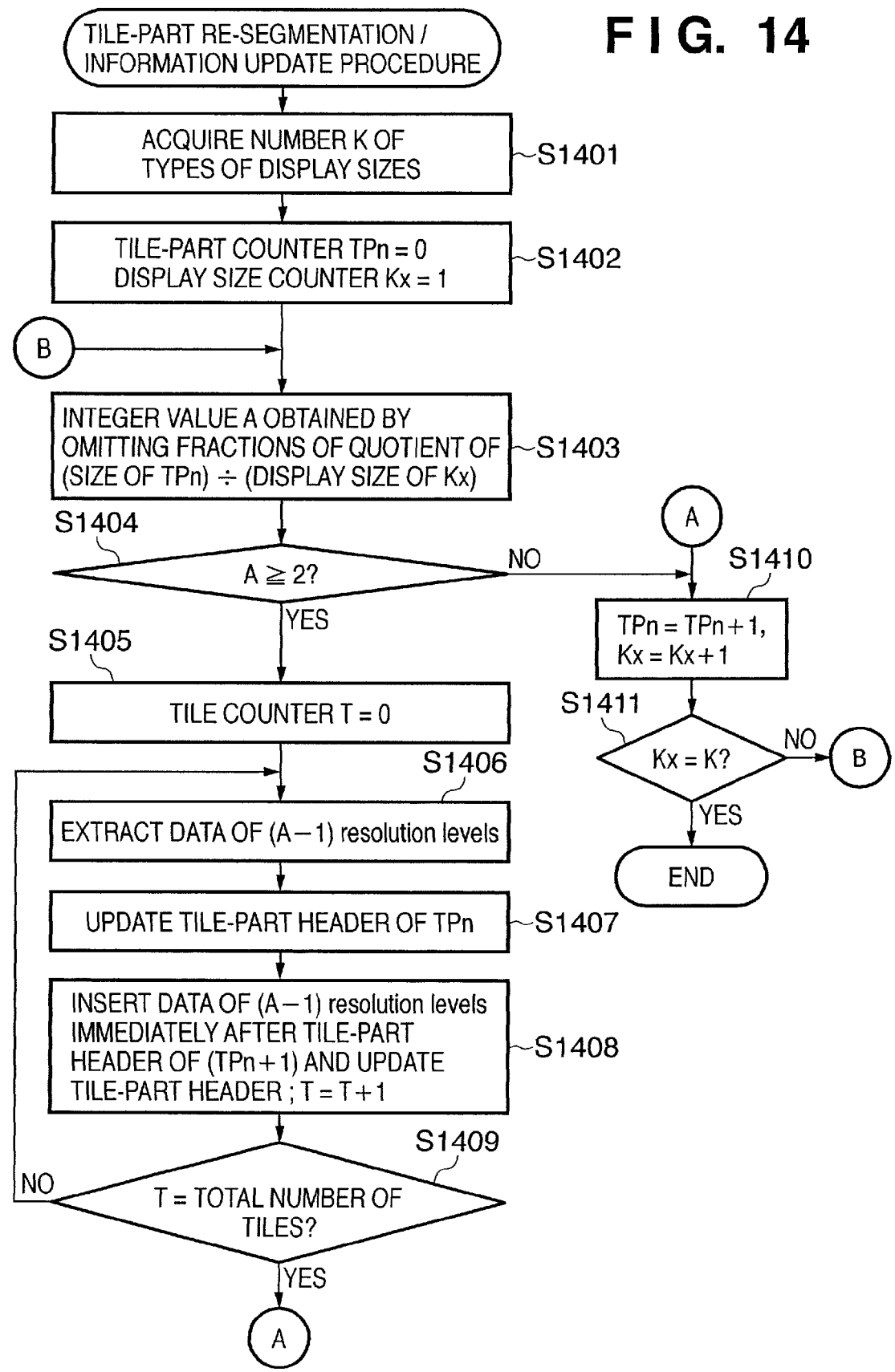
FIG. 14 is a flowchart showing details of re-segmenting tile parts and updating information processing.

FIG. 14 is a flowchart showing details of the processing in step S1302.

In step S1401, the CPU 101 acquires the number K of all display modes (display sizes). In this embodiment, since all the available display modes are the three different types of display modes shown in FIGS. 7A to 7C, K=3 (however, the full-screen display mode is executed in correspondence with the screen size (1024 pixels×768 pixels) of the notebook type PC).

In step S1402, the CPU 101 resets variable TPn used to count the number of tile-part data to zero, and also resets variable Kx used to count the number of display sizes to 1.

In step S1403, the CPU 101 calculates a result A by dividing the image size obtained upon decoding tile-part data TPn by the Kx-th smallest display size, and omitting fractions of that quotient. More specifically, the CPU 101 calculates a result A1 by dividing the vertical size of the image obtained upon decoding tile-part data TPn by the vertical size of the Kx-th smallest display size and omitting fractions of that quotient. Also, the CPU 101 calculates a result A2 by dividing the horizontal size of the image obtained upon decoding tile-part data TPn by the horizontal size of the Kx-th smallest display size and omitting fractions of that quotient. Then, the CPU 101 selects a larger one of A1 and A2 as A.

Note that the image size obtained upon decoding tile-part data TPn can be acquired with reference to the tile-part header without actually decoding this tile-part data TPn.

The CPU 101 checks in step S1404 if the calculated result A is equal to or larger than 2. If the result of checking is A≧2, the process advances to step S1405; otherwise, if A<2, the process advances to step S1410.

In this embodiment, if TPn=0 and Kx=1, in step S1403 the CPU 101 calculates the result A1=1 by dividing the vertical size=312 pixels of the image obtained upon decoding tile-part data 0 by the vertical size=256 pixels of the smallest display size, and omitting fractions of that quotient. Furthermore, the CPU 101 calculates the result A2=0 by dividing the horizontal size=208 pixels of the image obtained by decoding tile-part data 0 by the horizontal size=256 pixels of the smallest display size and omitting fractions of that quotient. Then, the CPU 101 selects A1=1 as a larger one of A1 and A2 as A. Therefore, in this case, the process advances to step S1410.

On the other hand, if TPn=2 and Kx=2, in step S1403 the CPU 101 calculates the result A1=2 by dividing the vertical size=2496 pixels of the image obtained upon decoding tile-part data 2 by the vertical size=1024 pixels of the second smallest display size, and omitting fractions of that quotient. Furthermore, the CPU 101 calculates the result A2=2 by dividing the horizontal size=1664 pixels of the image obtained by decoding tile-part data 0 by the horizontal size=768 pixels of the second smallest display size and omitting fractions of that quotient. Then, the CPU 101 selects A1 (A2)=2 as a larger one of A1 and A2 as A. Therefore, in this case, the process advances to step S1405.

In step S1405, the CPU 101 resets variable T used to count the number of tile data to zero.

In step S1406, the CPU 101 extracts data of (A−1) resolution levels from tile-part data with a larger decoded image size in tile data T. This can be attained by counting the number of packets from the head of tile-parts.

In this embodiment, since tile-part data 2 includes data of resolution levels 1, 2, and 3, the CPU 101 extracts data of 1 (i.e., 2−1, since A=2) resolution level from those with a larger decoded image size (resolution level 3). For this purpose, the number of layers×the number of components×the number of positions×2=1×3×1×2=6 packets are left from the head of the tile-part data, and the remaining three packets are extracted. Note that extracting packets amounts to removing these packets from original tile-part data. As a result, tile-part data 2 holds data of resolution levels 1 and 2.

In step S1407, the CPU 101 updates the tile-part header of tile-part data TPn. That is, the CPU 101 rewrites the Psot value indicating the data length of tile-part data TPn to a value smaller by the data length extracted in step S1406, and rewrites TNsot indicating the total number of tile-parts by the number K of display modes acquired in step S1401. In this embodiment, if the data size of resolution level 3 extracted in step S1406 is 50 bytes, and the value originally stored in Psot is 350, the CPU 101 overwrites 300 (350−50) as the value of Psot. Also, since the number TNsot of tile-parts is the number K=3 of display modes, that value remains unchanged if it is rewritten.

In step S1408, the CPU 101 moves the data of the resolution level extracted in step S1406 to a position immediately after the tile-part header of tile-part data (TPn+1) in tile data T. The CPU 101 then updates Psot indicating the data length and TNsot indicating the total number of tile-parts in the tile-part header of tile-part data (TPn+1).

In this embodiment, assume that the data size of data of resolution level 3 extracted from tile-part data 1 is 50 bytes, and Psot=200 and TNsot=3 in the tile-part header of tile-part data 2. In this case, the CPU 101 inserts data of resolution level 3 immediately after the header of tile-part data 2, and updates Psot to 250 (200+50) and rewrites the value of TNsot to the number K=3 of display modes in the tile-part header of tile-part data 2. The CPU 101 then updates the value of variable T by incrementing it by 1.

In step S1409, and the CPU 101 checks if the updated value of variable T matches the total number of tiles. If the value of variable T matches the total number of tiles, since it is determined that the processes in steps S1406 to S1408 are complete for all the tiles, the process advances to step S1410.

On the other hand, if they do not match, since it is determined that the processes in steps S1406 to S1408 are not yet complete for all the tiles, the process returns to step S1406 to repeat the subsequent processes.

In step S1410, the CPU 101 updates the value of variable TPn by incrementing it by 1, and also updates the value of variable Kx by incrementing it by 1.

The CPU 101 checks in step S1411 if the value of variable Kx has reached the value of K. If the value of variable Kx has reached the value of K, this processing ends; otherwise, the process returns to step S1403 to repeat the subsequent processes.

As a result of the aforementioned processing, in this embodiment, tile-part data 0, 1, and 2 become as follows:

Resolution level data held by tile-part data 0: resolution level 0→resolution level 0

Resolution level data held by tile-part data 1: resolution levels 1, 2, and 3→resolution levels 1 and 2

Resolution level data held by tile-part data 2: resolution level 4→resolution levels 3 and 4

Figure 15:
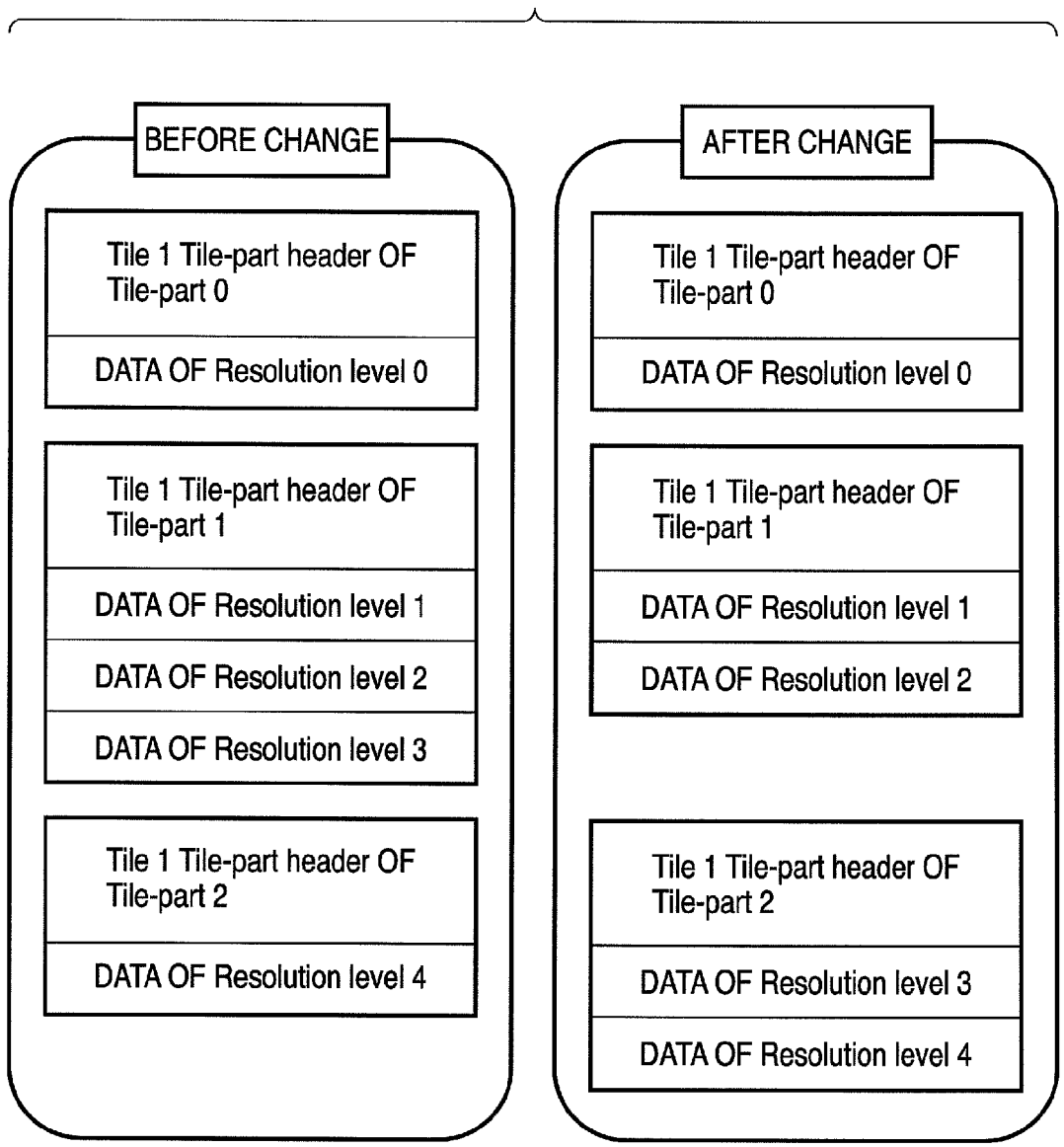
FIG. 15 is a view showing the data configuration of tile-part data 0, 1, and 2 before and after execution of the processing according to the flowchart shown in FIG. 14.

FIG. 15 shows the data configuration of tile-part data 0, 1, and 2 before execution of the processing according to the flowchart shown in FIG. 14, and data of tile-part data 0, 1, and 2 after execution. The left side in FIG. 15 shows the configuration before execution, and the right side in FIG. 15 shows that after execution.

In this embodiment, whether or not each tile-part data is suited to the intended use is checked in addition to checking of the grouping format in the first embodiment, and the reconstruction processing of tile-part data is executed again depending on the checking result. This reconstruction processing does not impose a heavy load since it can be decided by only the ratio of resizing done upon display.

Since tile-part data is re-segmented and the tile-part header is rewritten, even when data is exchanged between terminals having different display sizes, file formats suited to these terminals can be set. Also, even when data is exchanged between applications having different types of display sizes, file formats suited to these applications can be set.

Furthermore, re-segmenting tile-part data can be implemented by only replacement of packet data and rewriting of the tile-part header without re-decoding, and an overhead of this processing is small.

Third Embodiment

In the first and second embodiments, tile-part information is stored in the uuid box of the JP2 file format in a binary format. Alternatively, the tile-part information may be described in XML, and may be stored in an XML box. In this case, the difference from the first and second embodiments is the processes in steps S903 and S904 in FIG. 9.

In this embodiment, the CPU 101 searches the JP2 file for an XML box at the time of step S903. Then, the CPU 101 parses XML in the XML box at the time of step S904 to check if a tag that defines the grouping format is written, thus determining whether or not the format of the bitstream is the grouping format. This is because the tile-part information is stored in the XML format in this embodiment. For example, if it is defined that a tag the XML namespace of which is "http://www.format.cano.co.jp" is that of the grouping format, and if the tag of this namespace is described in XML, it is determined that the format of the bitstream is the grouping format.

FIG. 16 shows an example of tile-part information described in XML. The tile-part information shown in FIG. 16 indicates that the number of tile-parts is 3, and the size of an image obtained by decoding tile-part data 0 is 312 pixels× 208 pixels. Also, this information indicates that the size of an image obtained by decoding tile-part data 1 is 2496 pixels× 1664 pixels, and that obtained by decoding tile-part data 2 is 4992 pixels×3328 pixels.

It is defined that

"http://www.format.cano.co.jp" is used as the namespace, and the number of tile-parts, and the image sizes of respective tile-parts, and the tile-part numbers are respectively described as the value of a numTilePart tag, the values of sizeTilePartImage tags, and the values of an attribute id of the sizeTilePartImage tags. Likewise, read and write of the tile-part information can be changed.

An XML description may have a larger data size than a binary description, but has higher expandability than the binary description. For example, it is easier to add information of the number of tiles to the tile-part information than the binary description.

Fourth Embodiment

Tile-part information may include a data length from the head of encoded data to the last of each tile-part. That is, as the data length of tile-part data 0, the value as the sum of the data length of a main header and that of tile-part data 0 is stored as the tile-part information. As the data length of tile-part data 1, the value as the sum of the data length of a main header, that of tile-part data 0, and that of tile-part data 1 is stored as the tile-part information together with the sizes of images obtained upon decoding respective tile-part data.

Figure 18:
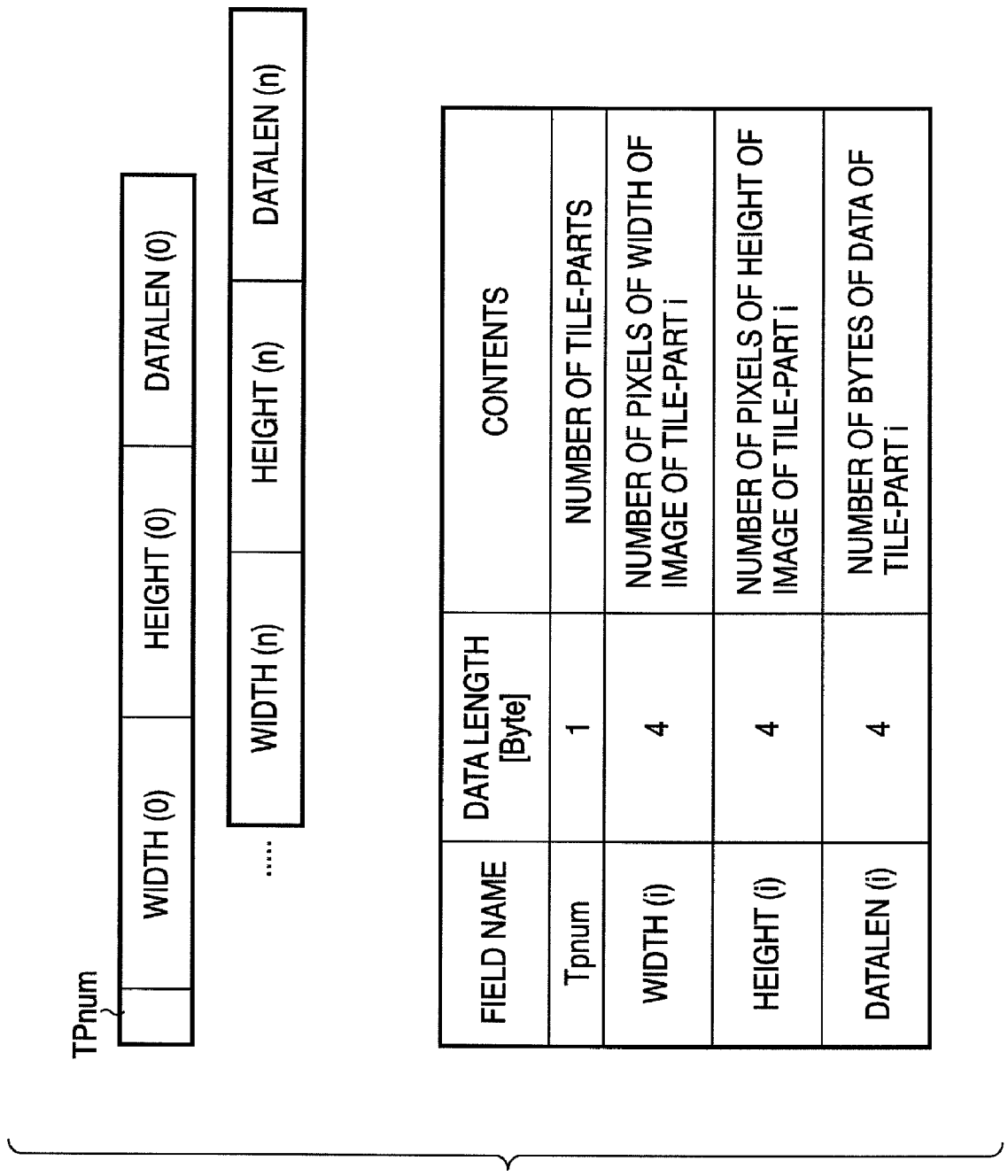
FIG. 18 is a view showing an example of the structure of binary data to be described in a uuid box when tile-part information includes the data lengths of tile-part data.

As an example, FIG. 17 shows a description example of tile-part information using XML in the bitstream having the format shown in FIG. 12. Assume that the data length of the main header 1200 is 100 bytes, and that of the data group 1201 of tile-part data 0 is 200 bytes. Also, the data length of the data group 1202 of tile-part data 1 is 300 bytes, and that of the data group 1203 of tile-part data 2 is 400 bytes. FIG. 18 shows an example of the structure of binary data to be described in the uuid box when the tile-part information includes the data lengths of tile-part data.

By describing the data lengths of respective tile-part data, the image processing apparatus need only acquire and decode the required number of bytes from the head. Especially, when the image processing apparatus is connected to an image data storage device via a network, this tile-part information is transmitted to the image processing apparatus first, and the image processing apparatus can recognize the number of bytes to be downloaded in advance. Therefore, like Content-range of the HTTP protocol generally used in the Internet, a client who uses a communication protocol that can receive only data within a required range of a file need not receive the entire image file. Also, such a client can designate the range to be downloaded, which is acquired in advance, and can receive data, thus suppressing wasteful data transfer.

Fifth Embodiment

In the first to fourth embodiments, tile-part information is stored in the file format. In this embodiment, tile-part information is stored in encoded data.

Figure 19:
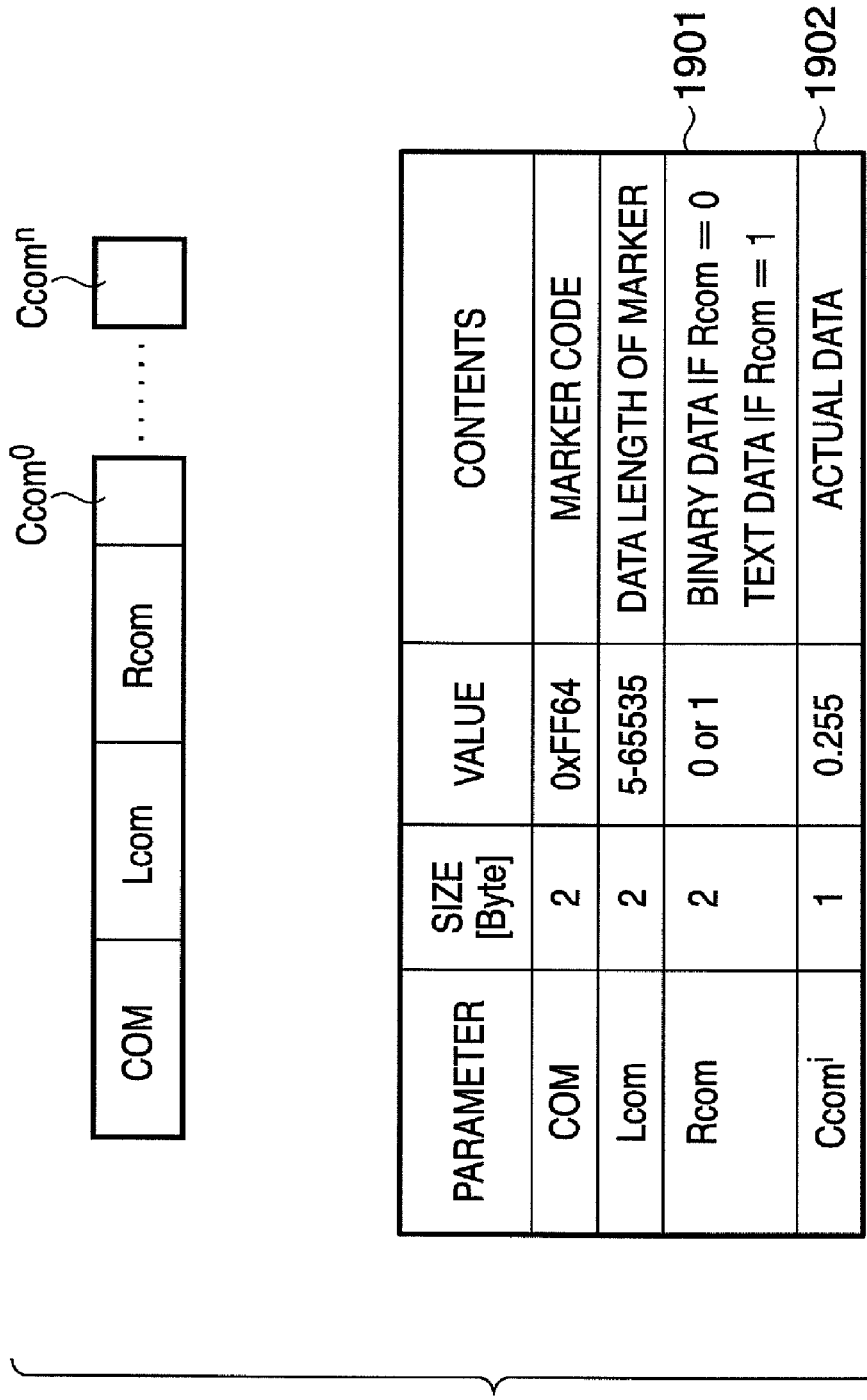
FIG. 19 is a view showing the structure of a COM marker.

A comment can be stored in JPEG2000 encoded data in the form of a COM marker. FIG. 19 shows the structure of a COM marker. The COM marker can be included in a main header or behind each tile-part header. If the value of Rcom 1901 is 0, it indicates that subsequent Ccom 1902 is described using binary data; if the value of Rcom is 1, it indicates that subsequent Ccom 1902 is described using character codes defined by ISO8859-15.

Therefore, the COM marker may be stored in the main header, and Rcom=0 may be set to store tile-part information in the binary format stored in the uuid box in Ccom 1902. Alternatively, Rcom=1 may be set to store data in the text format described in the XML box in Ccom.

By storing the tile-part information in the main header, since the main header located at the head need only be analyzed without searching for the tile-part information from the file format, the tile-part information can be acquired simultaneously with the JPEG2000 encode conditions.

Sixth Embodiment

The COM marker may be stored in each tile header. The tile-part information of the entire image described in the first to fifth embodiments may be stored in the COM marker. However, in this embodiment, a case will be explained below using FIG. 20 wherein data for respective tile-parts are described together.

When a COM marker having tile-part information is described in each tile-part header, since encoded data are re-arranged, the segmentation processing into tile-parts in step S1008 and the write processing in step S1009 are processed at the same time.

Figure 20:
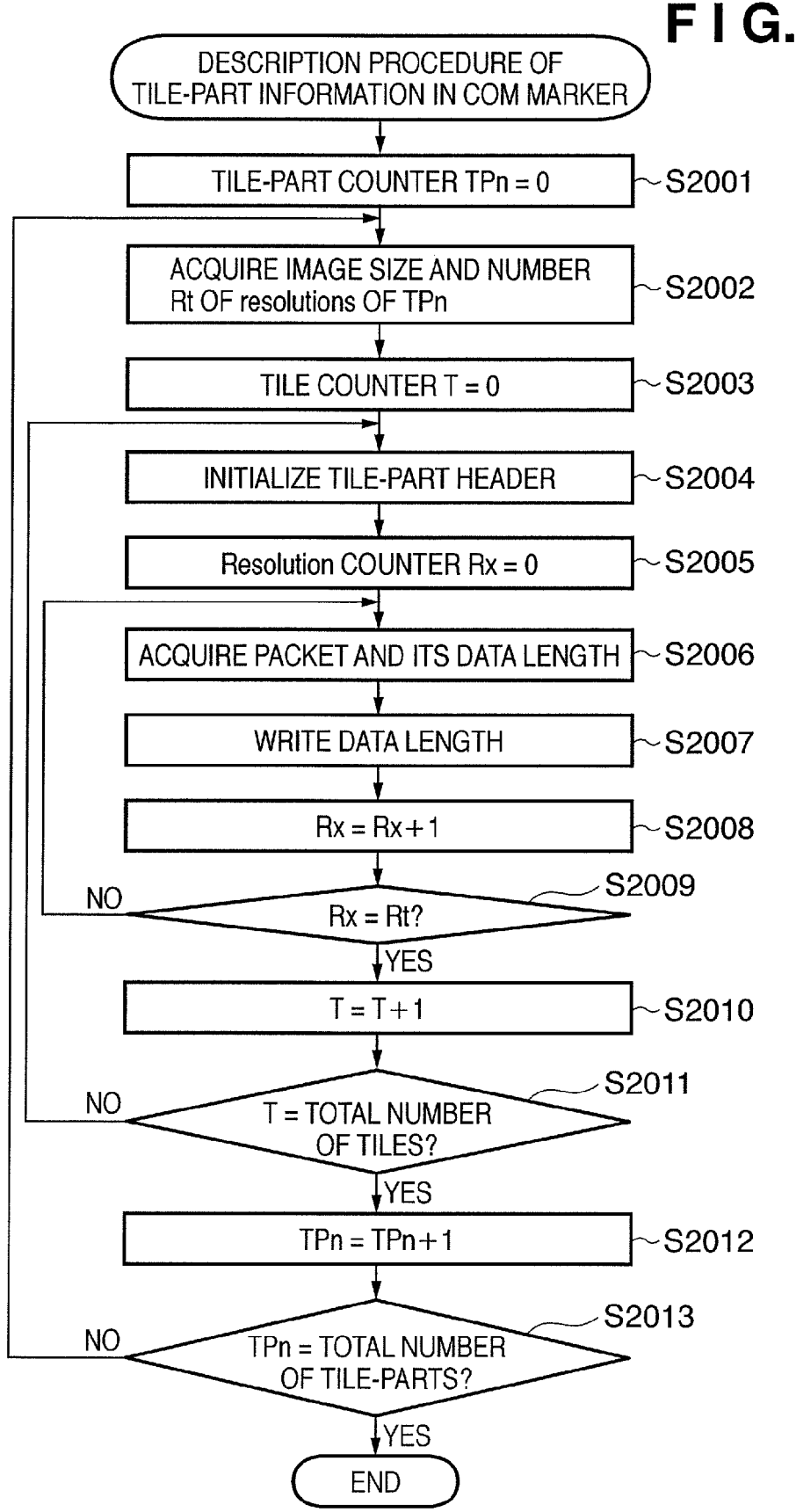
FIG. 20 is a flowchart of processing that describes data for respective tile-parts together.

Referring to FIG. 20, the CPU 101 resets variable TPn used to count the number of tile-part data to zero in step S2001. In step S2002, the CPU 101 acquires the size of an image obtained by decoding tile-part data TPn and the number Rt of data of resolution levels with reference to the result of the association processing in step S1007.

In this embodiment, when TPn=0, the CPU 101 acquires 312 pixels×208 pixels as the image size, and 1 as the number Rt. When TPn=1, the CPU 101 acquires 2496 pixels×1664 pixels as the image size, and 3 as the number Rt. When TPn=2, the CPU 101 acquires 4992 pixels×3328 pixels as the image size, and 1 as the number Rt.

In step S2003, the CPU 101 resets variable T used to count the number of tile data to zero. In step S2004, the CPU 101 initializes a header of tile-part data TPn. In this embodiment, when TPn=1, the CPU 101 substitutes T in the tile number of the tile-part header shown in FIG. 3C, 1 in the tile-part number, and 3 in the total number of tile-parts. Furthermore, the CPU 101 prepares a box 2101 shown in FIG. 21 as Ccom 1902 of the COM marker that follows the tile-part header. The data of resolution levels included in tile-part data 1 are data of three resolution levels 1, 2, and 3. By decoding this tile-part data, the obtained image size is 2496 pixels×1664 pixels, "3" is set in Rinside 2102, "2496" is set in WIDTH 2103, and "1664" is set in HEIGHT 2104. Three "RDLens" 2105 are prepared.

Referring back to FIG. 20, in step S2005 the CPU 101 resets variable Rx used to count the number of data of resolution levels to zero. In step S2006, the CPU 101 acquires packet data and its data length of the Rx-th resolution level included in tile-part data TPn. In this embodiment, packet data of resolution level 1 are to be acquired.

In step S2007, the CPU 101 writes the data acquired in step S2006 behind the COM marker, and its data length in the Rx-th RDlen. In step S2008, the CPU 101 updates the value Rx by incrementing it by 1. Then, in step S2009, the CPU 101 checks if Rx=Rt. If Rx≠Rt, the process returns to step S2006 to repeat the subsequent processes. In the case of this embodiment, if TPn=1, the process advances to step S2010 after the processes in step S2006 and S2007 are repeated three times.

On the other hand, if Rx=Rt, the process advances to step S2010 to update the value of variable T by incrementing it by 1. Then, in step S2011, it is checked if the updated value of variable T matches the total number of tiles. If they do not match, the process returns to step S2004 to repeat the subsequent processes.

On the other hand, if they match, the process advances to step S2012, to update the value of variable TPn by incrementing it by 1. Then, in step S2013, it is checked if the value of TPn matches the total number of tile-part data. As a result of checking, if they match, this processing ends; otherwise, the process returns to step S2002 to repeat the subsequent processes.

Upon execution of the processing according to the flowchart shown in FIG. 20, the COM marker of tile-part data 1 is, for example:

Rinside 2101=3
WIDTH 2102=2103
HEIGHT 2104=1664
RDLen0=30
RDLen1=40
RDLen2=50

In this way, since the data lengths of respective included resolution levels are described for respective tile-part data, the processing can be facilitated upon re-segmenting tile-parts. That is, data of each resolution level can be easily separated by extracting them from a position behind tile-part data by the number of bytes described in the COM marker without analyzing packets and calculating the number of packets to be extracted.

Seventh Embodiment

In the first to sixth embodiments, the file format having three resolutions is used. Alternatively, the file format may be configured by two resolutions, i.e., a thumbnail and main image.

The first to sixth embodiments adopt RLCP as the progression order of the bitstream. However, the same applies to RPCL upon segmenting by resolution levels.

In the first to sixth embodiments, respective tile-part data are segmented by resolution levels. Alternatively, the tile-part data may be segmented by other specifications such as layers, color components, or the like.

Upon segmenting tile-part data by Layers, the progression order of JPEG2000 encoded data may be set as LRCP, and image quality data (e.g., bpp) may be stored as tile-part information in place of the image sizes of respective tile-parts. Segmentation by Layers is particularly effective for an image display system that provides a plurality of image qualities.

Upon segmenting tile-part data by components, the progression order of JPEG2000 encoded data may be set as CPRL, and color component information of respective tile-parts may be stored as information of respective tile-parts in place of the image sizes. This is particularly effective for an image display system which selectively uses monochrome and color displays when color components of JPEG2000 data are YCbCr.

The format segmented based on resolution levels and that segmented based on layers may be selectively used depending on the types of images. In this case, information indicating one of resolutions, layers, and components used to execute tile-part segmentation is described as tile-part information, and data, image sizes, image qualities, or color components may be described accordingly.

According to each of the above embodiments, by using JPEG2000 encoded data including difference data between resolutions according to the grouping format, the file size can be prevented from being increased. Resolution images required for image display are prepared, and each individual application can quickly access only an image of a required resolution (or image quality/color component) using tile-parts and tile-part information.

By segmenting into tile-parts, required data need not be picked up from one stream of JPEG2000 encoded data, and data need only be decoded from the head. Therefore, the number of seek times can be reduced, and time required until display can be shortened.

Furthermore, in a circumstance in which a device that stores images is different from a device that displays images, and these devices are connected via a network, the time required until display of images can be shortened. Especially, by setting the data lengths of respective tile-part data in tile-part information, when the tile-part information is acquired prior to image data, the required data size need only be downloaded. Therefore, the traffic is reduced, thus shortening the time required until display of images.

Moreover, by segmenting an image into tiles, the random accessibility to a partial region of the image can be assured. Therefore, upon displaying only a part of a high-resolution image, an image can be displayed by decoding only required tile data, and a high-definition image can be displayed within a short period of time.

Other Embodiments

A recording medium (or storage medium), which records program code of a software program that can implement the functions of the above-mentioned embodiments can be supplied to a system or apparatus. A computer (or a CPU or MPU) of the system or apparatus reads out and executes the program code stored in the recording medium. In this case, the program code itself read out from the storage medium implements the functions of the above-described embodiments (flowcharts).

When the computer executes the readout program code, an operating system (OS) running on the computer executes some or all actual processes based on an instruction of the program code.

Furthermore, the program code read out from the recording medium can be written in a memory equipped on a function expansion card or a function expansion unit, which is inserted in or connected to the computer. The functions of the above-mentioned embodiments may be implemented when a CPU or the like arranged in the expansion card or unit then executes some or all of actual processes based on an instruction of the program code.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent No. 2006-149022, filed May 29, 2006, which is hereby incorporated by reference herein in its entirety.

What is claimed is:

1. An image processing method for controlling an image processing device comprising:

acquiring encoded image data that includes encoded data of a plurality of tiles obtained by segmenting an image into tiles, and encoding the tiles to be decodable at a plurality of resolutions;

determining whether encoded data of each tile in the acquired encoded image data consists of data of at least three tile-parts, wherein the at least three tile-parts contains tile-part 0, tile-part 1, and tile-part 2, wherein data of the tile-part 0 contains encoded data of a resolution level 0, data of the tile-part 1 contains encoded data of resolution levels 1-L (1<L<N), and data of the tile-part 2 contains encoded data of resolution levels L-N (N>L), and wherein a resolution of an image obtained by decoding the data of the tile-parts 0 and 1 is higher than that of an image obtained by decoding the data of the tile-part 0 and a resolution of an image obtained by decoding the data of the tile-parts 0, 1, and 2 is higher than that of an image obtained by decoding the data of the tile-parts 0 and 1;

designating tile-parts, for each tile, to be decoded to obtain an image with a designated resolution;

decoding data of the tile-parts designated for each tile, when it is determined that encoded data of each tile in the acquired encoded image data consists of the data of the at least three tile-parts;

resizing, as a resized image, an image obtained by decoding the designated tile-parts;

outputting the resized image;

reconstructing the acquired encoded image data so that encoded data of each tile in the acquired encoded image data consists of the data of the at least three tile-parts, when it is determined that encoded data of each tile in the acquired encoded image data does not consist of the data of the at least three tile-parts; and reconstructing the acquired encoded image data by moving encoded data of at least one resolution level from/to data of the designated tile-parts to/from that of non-designated tile-parts so that a resolution of an image obtained by decoding the designated tile-parts approximates that of the resized image, when it is determined that encoded data of each tile in the acquired encoded image data consists of the data of the at least three tile-parts and enlargement/reduction scale of the resizing is one of 50%, less than 50%, 200%, and more than 200%.

2. The method according to claim 1, wherein the reconstructed encoded image data is compliant to JPEG2000 JP2 file format, the data of the tile-part 0 in the reconstructed encoded image data is data to be decoded to obtain a thumbnail image, the data of the tile-part 1 in the reconstructed encoded image data is data to be decoded together with the data of the tile-part 1 to obtain a display image having size of a display screen, and the data of the tile-part 2 in the reconstructed encoded image data is data to be decoded together with the data of the tile-parts 0 and 1 to obtain an image larger than both the thumbnail image and an image obtained by decoding the data of the tile-parts 0 and 1.

3. A non-transitory computer-readable storage medium storing a program for making a computer execute an image processing method according to claim 1.

4. An image processing apparatus comprising:

an acquisition unit adapted to acquire encoded image data that includes encoded data of a plurality of tiles obtained by segmenting an image into tiles, and encoding the tiles to be decodable at a plurality of resolutions;

a determining unit adapted to determine whether encoded data of each tile in the acquired encoded image data consists of data of at least three tile-parts, wherein the at least three tile-parts contains tile-part 0, tile-part 1, and tile-part 2, wherein data of the tile-part 0 contains encoded data of a resolution level 0, data of the tile-part 1 contains encoded data of resolution levels 1-L (1<L<N), and data of the tile-part 2 contains encoded data of resolution levels L-N (N>L), and wherein a resolution of an image obtained by decoding the data of the tile-parts 0 and 1 is higher than that of an image obtained by decoding the data of the tile-part 0 and a resolution of an image obtained by decoding the data of the tile-parts 0, 1, and 2 is higher than that of an image obtained by decoding the data of the tile-parts 0 and 1;

a designating unit adapted to designate tile-parts, for each tile, to be decoded to obtain an image with a designated resolution;

a decoding unit adapted to decode data of the tile-parts designated for each tile, when it is determined that encoded data of each tile in the acquired encoded image data consists of the data of the at least three tile-parts;

a resizing unit adapted to resize, as a resized image, an image obtained by decoding the designated tile-parts;

an outputting unit adapted to output the resized image;

a reconstruction unit adapted to reconstruct the acquired encoded image data so that encoded data of each tile in the acquired encoded image data consists of the data of the at least three tile-parts, when it is determined that encoded data of each tile in the acquired encoded image data does not consist of the data of the at least three tile-parts, and to reconstruct the acquired encoded image data by moving encoded data of at least one resolution level from/to data of the designated tile-parts to/from that of non-designated tile-parts so that a resolution of an image obtained by decoding the designated tile-parts approximates that of the resized image, when it is determined that encoded data of each tile in the acquired encoded image data consists of the data of the at least three tile-parts and enlargement/reduction scale of the resizing is one of 50%, less than 50%, 200%, and more than 200%.

* * * * *